(12) United States Patent
Shukla et al.

(10) Patent No.: US 8,170,901 B2
(45) Date of Patent: May 1, 2012

(54) EXTENSIBLE FRAMEWORK FOR DESIGNING WORKFLOWS

(75) Inventors: Dharma K. Shukla, Sammamish, WA (US); Aditya G. Bhandarkar, Redmond, WA (US); Akash J. Sagar, Redmond, WA (US); Sergey Chub, Redmond, WA (US); Mayank Mehta, Bellevue, WA (US); Dennis Pilarinos, Redmond, WA (US); Eli Hisdai, Bellevue, WA (US); Abhay Vinayak Parasnis, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1363 days.

(21) Appl. No.: 11/046,967

(22) Filed: Jan. 31, 2005

(65) Prior Publication Data

US 2006/0074730 A1    Apr. 6, 2006

Related U.S. Application Data

(60) Provisional application No. 60/615,549, filed on Oct. 1, 2004.

(51) Int. Cl.
*G06Q 10/00* (2006.01)
(52) U.S. Cl. ...................... 705/7.27; 705/7.12
(58) Field of Classification Search .......... 705/2, 7, 705/8, 9, 7.12, 7.27; 717/102, 105, 129
See application file for complete search history.

(56) References Cited

U.S. PATENT DOCUMENTS

| | | | |
|---|---|---|---|
| 5,301,320 A | 4/1994 | McAtee et al. | |
| 5,634,127 A | 5/1997 | Cloud et al. | |
| 5,734,837 A | 3/1998 | Flores et al. | |
| 5,774,661 A | 6/1998 | Chatterjee et al. | |
| 5,870,545 A | 2/1999 | Davis et al. | |
| 5,930,512 A | 7/1999 | Boden et al. | |
| 6,012,066 A | 1/2000 | Discount et al. | |
| 6,016,394 A | 1/2000 | Walker | |
| 6,028,997 A | 2/2000 | Leymann et al. | |
| 6,065,009 A | 5/2000 | Leymann et al. | |
| 6,073,109 A * | 6/2000 | Flores et al. ...................... | 705/8 |
| 6,115,646 A | 9/2000 | Fiszman et al. | |
| 6,225,998 B1 | 5/2001 | Okita et al. | |
| 6,253,369 B1 | 6/2001 | Cloud et al. | |
| 6,397,192 B1 | 5/2002 | Notani et al. | |

(Continued)

FOREIGN PATENT DOCUMENTS

DE      10204310 A1    8/2003

(Continued)

OTHER PUBLICATIONS

Unknown, "Lotus Workflow," IBM Lotus Workflow Overview, http://www.lotus.com/products/product3.nsf/wdocs/wfhome, IBM Corporation, printed on May 31, 2005, 2 pages, U.S.A.

(Continued)

*Primary Examiner* — Beth V Boswell
*Assistant Examiner* — Ernest A Jackson
(74) *Attorney, Agent, or Firm* — Senniger Powers LLP

(57) ABSTRACT

A user interface for building a componentized workflow model. Each step of the workflow is modeled as an activity that has metadata to describe design time aspects, compile time aspects, and runtime aspects of the workflow step. A user selects and arranges the activities to create the workflow via the user interface. The metadata associated with each of the activities in the workflow is collected to create a persistent representation of the workflow. Users extend the workflow model by authoring custom activities.

15 Claims, 12 Drawing Sheets

U.S. PATENT DOCUMENTS

| | | | |
|---|---|---|---|
| 6,405,364 B1 | 6/2002 | Bowman-Amuah | |
| 6,421,700 B1 | 7/2002 | Holmes et al. | |
| 6,567,783 B1 | 5/2003 | Notani et al. | |
| 6,604,104 B1 | 8/2003 | Smith | |
| 6,606,642 B2* | 8/2003 | Ambler et al. | 709/200 |
| 6,621,505 B1 | 9/2003 | Beauchamp et al. | |
| 6,678,882 B1 | 1/2004 | Hurley et al. | |
| 6,768,986 B2 | 7/2004 | Cras et al. | |
| 6,799,208 B1 | 9/2004 | Sankaranarayan et al. | |
| 6,807,583 B2 | 10/2004 | Hrischuk et al. | |
| 6,845,507 B2 | 1/2005 | Kenton | |
| 6,898,604 B1 | 5/2005 | Ballinger et al. | |
| 6,954,747 B1 | 10/2005 | Wang et al. | |
| 6,964,034 B1 | 11/2005 | Snow | |
| 6,985,939 B2 | 1/2006 | Fletcher et al. | |
| 7,062,537 B2 | 6/2006 | Aziz et al. | |
| 7,069,536 B2 | 6/2006 | Yaung | |
| 7,093,207 B1 | 8/2006 | Liao et al. | |
| 7,096,454 B2 | 8/2006 | Damm et al. | |
| 7,107,340 B2 | 9/2006 | Chkodrov et al. | |
| 7,133,833 B1 | 11/2006 | Chone et al. | |
| 7,181,440 B2 | 2/2007 | Cras et al. | |
| 7,222,334 B2 | 5/2007 | Casati et al. | |
| 7,240,324 B2 | 7/2007 | Casati et al. | |
| 7,272,816 B2 | 9/2007 | Schulz et al. | |
| 7,343,364 B2 | 3/2008 | Bram et al. | |
| 7,389,335 B2 | 6/2008 | MacLeod et al. | |
| 7,451,432 B2 | 11/2008 | Shukla et al. | |
| 7,464,366 B2 | 12/2008 | Shukla et al. | |
| 7,571,187 B2 | 8/2009 | Chkodrov et al. | |
| 2002/0032692 A1 | 3/2002 | Suzuki et al. | |
| 2002/0035606 A1* | 3/2002 | Kenton | 709/206 |
| 2002/0040312 A1 | 4/2002 | Dhar et al. | |
| 2002/0065701 A1 | 5/2002 | Kim et al. | |
| 2002/0147606 A1 | 10/2002 | Hoffmann et al. | |
| 2002/0161859 A1* | 10/2002 | Willcox et al. | 709/219 |
| 2002/0170035 A1 | 11/2002 | Casati et al. | |
| 2002/0184610 A1 | 12/2002 | Chong et al. | |
| 2002/0188644 A1 | 12/2002 | Seidman | |
| 2003/0004771 A1 | 1/2003 | Yaung | |
| 2003/0018508 A1* | 1/2003 | Schwanke | 705/9 |
| 2003/0023604 A1 | 1/2003 | O'Brien et al. | |
| 2003/0055668 A1 | 3/2003 | Saran et al. | |
| 2003/0078820 A1 | 4/2003 | Ouchi | |
| 2003/0084016 A1 | 5/2003 | Norgaard et al. | |
| 2003/0135659 A1 | 7/2003 | Bellotti et al. | |
| 2003/0144891 A1* | 7/2003 | Leymann et al. | 705/7 |
| 2003/0177046 A1 | 9/2003 | Socha-Leialoha | |
| 2003/0181991 A1 | 9/2003 | Chau et al. | |
| 2003/0200527 A1* | 10/2003 | Lynn et al. | 717/102 |
| 2003/0217053 A1* | 11/2003 | Bachman et al. | 707/4 |
| 2003/0220707 A1 | 11/2003 | Budinger et al. | |
| 2003/0225769 A1 | 12/2003 | Chkodrov et al. | |
| 2003/0233374 A1 | 12/2003 | Spinola et al. | |
| 2004/0003353 A1 | 1/2004 | Rivera et al. | |
| 2004/0078105 A1 | 4/2004 | Moon et al. | |
| 2004/0078373 A1 | 4/2004 | Ghoneimy et al. | |
| 2004/0078778 A1 | 4/2004 | Leymann et al. | |
| 2004/0133457 A1 | 7/2004 | Sadiq et al. | |
| 2004/0139426 A1 | 7/2004 | Wu | |
| 2004/0148213 A1 | 7/2004 | Aziz et al. | |
| 2004/0148214 A1* | 7/2004 | Aziz et al. | 705/8 |
| 2004/0153350 A1 | 8/2004 | Kim et al. | |
| 2004/0162741 A1 | 8/2004 | Flaxer et al. | |
| 2004/0168155 A1* | 8/2004 | O'Farrell et al. | 717/129 |
| 2004/0221261 A1 | 11/2004 | Blevins | |
| 2005/0004888 A1 | 1/2005 | McCrady et al. | |
| 2005/0034098 A1 | 2/2005 | DeSchryver et al. | |
| 2005/0050311 A1 | 3/2005 | Joseph et al. | |
| 2005/0066002 A1 | 3/2005 | Teres et al. | |
| 2005/0066287 A1 | 3/2005 | Tattrie et al. | |
| 2005/0071209 A1 | 3/2005 | Tatavu et al. | |
| 2005/0149908 A1 | 7/2005 | Klianev | |
| 2005/0177820 A1* | 8/2005 | Mei et al. | 717/129 |
| 2005/0192963 A1 | 9/2005 | Tschiegg et al. | |
| 2005/0193286 A1 | 9/2005 | Thatte et al. | |
| 2005/0204333 A1 | 9/2005 | Denby et al. | |
| 2005/0267889 A1 | 12/2005 | Snyder et al. | |
| 2006/0004845 A1 | 1/2006 | Kristiansen et al. | |
| 2006/0059253 A1 | 3/2006 | Goodman et al. | |
| 2006/0064335 A1 | 3/2006 | Goldszmidt et al. | |
| 2006/0074714 A1* | 4/2006 | Aziz et al. | 705/2 |
| 2006/0074732 A1* | 4/2006 | Shukla et al. | 705/8 |
| 2006/0074734 A1 | 4/2006 | Shukla et al. | |
| 2006/0074735 A1* | 4/2006 | Shukla et al. | 705/8 |
| 2006/0074736 A1 | 4/2006 | Shukla et al. | |
| 2006/0112122 A1 | 5/2006 | Goldszmidt et al. | |
| 2006/0143193 A1 | 6/2006 | Thakkar et al. | |
| 2006/0206863 A1 | 9/2006 | Shenfield et al. | |
| 2006/0225032 A1 | 10/2006 | Klerk et al. | |
| 2006/0236304 A1* | 10/2006 | Luo et al. | 717/105 |
| 2006/0241954 A1 | 10/2006 | Jeng et al. | |
| 2006/0271927 A1 | 11/2006 | Morales et al. | |
| 2008/0320486 A1 | 12/2008 | Bose et al. | |

FOREIGN PATENT DOCUMENTS

| | | |
|---|---|---|
| DE | 10215653 A1 | 11/2003 |
| EP | 0 697 652 A1 | 2/1996 |
| EP | 0953929 A2 | 11/1999 |
| EP | 1238688 A2 | 9/2002 |
| GB | 2 263 988 A | 8/1993 |
| GB | 2396928 A | 7/2004 |
| JP | 05-135121 | 6/1993 |
| JP | 09-204467 | 8/1997 |
| JP | 11-316780 | 11/1999 |
| JP | 2001-282970 | 10/2001 |
| JP | 2002-259643 | 9/2002 |
| JP | 2004-206694 | 7/2004 |
| WO | 00/54202 A2 | 9/2000 |
| WO | WO 2005/004025 A1 | 1/2005 |
| WO | WO 2005/008433 A2 | 1/2005 |

OTHER PUBLICATIONS

Unknown, "Vicidocs Viciflow," Electronic Workflow Management System, http://www.vicidocs.com/viciflow.asp, Vicisoft Technologies, printed on May 31, 2005, 3 pages, U.S.A.

Unknown, "Business Process Management With SAP NetWeaver," SAP Solution Brief, http://www.sap.com/solutions/netweaver/pdf/BWP_Netweaver_BPM.pdf, SAP AG, Apr. 2004, 4 pages, Germany.

Brambilla, M. et al., "Exception Handling within Workflow-based Web Applications," Web Engineering, 4th International Conference, Munich: LNCS Springer, 2004, 14 pgs., http://www.webml.org/webml/upload/ent5/1/213_brambilla_icwe2004.pdf.

Hagen, C. et al., "Exception Handling in Workflow Management Systems," IEEE Transactions on Software Engineering, Oct. 2000, vol. 26, No. 10, pp. 943-958.

Perkins, A., "Business Rules=Meta-Data," Proceedings of the Technology of Object-Oriented Languages and Systems (Tools 34'00), 2000, pp. 285-294.

Zhao, Z. et al., "Dynamic Workflow in a Grid Enabled Problem Solving Environment," Proceeding of 5th International Conference on Computer and Information Technology, IEEE 2005, 7 pgs.

Parasnis, "Session Code: DAT321—Data Systems—BizTalk Orchestration Engine Futures," Microsoft Professional Developers Conference 2003, Oct. 27, 2003, 13 pages, Microsoft Corporation, U.S.A.

Virdell, "Business Processes and Workflow in the Web Services World," printed from http://www-106.ibm.com/developerworks/webservices/library/ws-work.html, IBM Corporation, Jan. 1, 2003, 6 pages, U.S.

Boiko, "Everyone talks About Workflow, But What Is It, Really?" printed from http://www.cmswatch.com/Features/TopicWatch/FeaturedTopic/?feature_id=47, CMSWorks, Inc., Oct. 4, 2001, 5 pages, U.S.

Adkins, "Introduction to Workflow Learning," printed from http://www.internettime.com/workflow/intro_wfl.htm, Workflow Learning Institute, Internet Time Group LLC, Nov. 2003, 11 pages, U.S.

Marshak, "IBM's Flowmark Object-Oriented Workflow for Mission-Critical Applications," Workgroup Computing Report, vol. 17, No. 5, May 1, 1994, pp. 3-13, U.S.A.

Maurer et al., "Merging Project planning and Web-Enabled Dynamic Workflow Technologies," IEEE Internet Computing, Jun. 2000, pp. 65-74, IEEE Service Center U.S.A.

Goff et al., "Object Serialization and Decimalization using XML," Apr. 2001, CERN, Switzerland, pp. 1-14.

ISO/IEC, "Document Schema Definition Languages (DSDL)—Part 4: Namespace-based Validation Dispatching Language—NVDL," May 2004, available at http://dsdl.org, pp. i-vi, 1-45.

Blake,"Coordinating Multiple Agents for Workflow-oriented Process Orchestration," Springer-Verlag, 2003, pp. 387-404.

Anonymous, "Open Source Workflow Engines in Java," available at http://web.archive.org/web/20051214041940/http://java-source.net/open-source/workflow-engines>, Dec. 14, 2005, 6 pages.

Wikipedia, "Saved Game," available at http://en.wikipedia.org/w/index.php?title=Saved_game&oldid=42574026>, Mar. 7, 2006, 4 pages.

Schiefer, J. et al., "Process information factory: a data management approach for enhancing business process intelligence," Published Jul. 6-9, 2004, IEEE.

Prasanta Bose and Mark G. Matthews, "Dynamic Change in Workflow-Based Coordination of Distributed Services," R. Laddaga, P. Robertson, and H. Shrobe (Eds.): Lecture Notes in Computer Science 2614, pp. 171-186, 2003. ISBN 978-3-540-00731-9.

Michael zur Muehlen and Michael Rosemann "Workflow-based Process Monitoring and Controlling—Technical and Organizational Issues," Proceedings of the 33rd Hawaii International Conference on System Sciences—2000, 0-7695-0493-0/00 $10.00 (c) 2000 IEEE.

Charles Plesums, "Introduction to Workflow," in Workflow Handbook 2002: Published in Association with the Management Coalition, Layna Fischer, Ed., p. 19-38, ISBN: 0970350929.

Kuczun et al., "Network Design: Tasks & Tools", in proceedings of the conference on Designing interactive systems, 1997, pp. 215-222.

Fahringer et al., "A-GWL: Abstract Grid Workflow Language", May 12, 2004; Computational Science—ICCS 2004; [Lecture Notes in Computer Science; LNCS]; Springer-Verlag, Berlin/Heidelberg, pp. 42-49.

Liu et al., "A Systematic Approach to Flexible Specification, Composition, and Restructuring of Workflow Activities"; Journal of Database Management; vol. 15, No. 1; Jan.-Mar. 2004; pp. 1-40.

Riemer, "The Air Force Security Assistance Center", DISAM Journal, vol. 26, No. 4, 1, Summer 2004, 22 pgs.

"Oracle Designer/2000, Process Modeling Guide, Release 1.0, Part No. A37359-1," pp. 3-1 to 3-23, Oracle Corporation, Accession Date at Japan Patent Office Information Center: Mar. 9, 2001.

* cited by examiner

FIG. 9

WORKFLOW DESIGNER

SPECIFY DETAILS FOR "SEND FOR APPROVAL"

CHOOSE THE CONDITIONS AND ACTIONS THAT DEFINE THIS STEP OF THE WORKFLOW:

| SET CONDITIONS | WHEN AUTHOR IS JOHN SMITH |
| ADD ACTIONS ▶ | EMAIL FOO.ASPX TO FRONTPAGE PM VIA EMAIL THEN SEND CURRENT DOCUMENT FOR APPROVAL TO USER'S MANAGER |

| SET CONDITIONS | ELSE WHEN AUTHOR IS KIM SMITH |
| ADD ACTIONS ▶ | EMAIL FOO2.ASPX TO SHAREPOINT PM AND SEND CURRENT DOCUMENT FOR APPROVAL TO USER'S MANAGER |

ADD CONDITIONAL BRANCH

SETTINGS FOR THIS STEP

NAME: SEND FOR APPROVAL

WORKFLOW STEPS
- SEND FOR APPROVAL
- ARCHIVE DOCUMENT
- NOTIFY MANAGERS

ADD WORKFLOW STEP

[CANCEL] [< BACK] [NEXT >] [FINISH]

EXTENSIBLE FRAMEWORK FOR DESIGNING WORKFLOWS

CROSS-REFERENCE TO RELATED APPLICATION

This application claims the benefit of U.S. provisional patent application No. 60/615,549 filed Oct. 1, 2004.

TECHNICAL FIELD

Embodiments of the present invention relate to the field of workflow modeling. In particular, embodiments of this invention relate to a componentized and extensible workflow model.

BACKGROUND OF THE INVENTION

Existing systems attempt to map business problems to high-level workflows by modeling the business problem. However, real world workflows vary in a variety of dimensions such as (a) execution and modeling complexity, (b) knowledge of the structure of the flow at design time, (c) statically defined or ad-hoc/dynamic, (d) ease of authoring and editing the flow at various points in its lifecycle, and (e) weak or strong association of business logic with the core workflow process. Existing models fail to accommodate all these factors.

Further, most existing workflow models are based on either language-based approaches (e.g., BPEL4WS, XLANG/S, and WSFL) or application based approaches. Language based approaches are high-level workflow languages with a closed set of pre-defined constructs help model the workflow process to the user/programmer. The workflow languages carry all of the semantic information for the closed set of constructs to enable the user to build a workflow model. However, the languages are not extensible by the developers and represent a closed set of primitives that constitute the workflow model. The languages are tied to the language compiler shipped by the workflow system vendor. Only the workflow system product vendor may extend the model by extending the language with a new set of constructs in a future version of the product. This often requires upgrading the compiler associated with the language.

Application based approaches are applications which have the workflow capabilities within the application to solve a domain specific problem. These applications are not truly extensible nor do they have a programmable model.

With the existing approaches, the issues of complexity, foreknowledge, dynamic workflows, authoring ease, and strength of associations with business logic and core workflows are not adequately addressed. There are no extensible, customizable, and re-hostable workflow designer frameworks available to build visual workflow designers to model different classes of workflows. Existing systems lack a rapid application development (RAD) style workflow design experience which allows users to graphically design the workflow process and associate the business logic in a programming language of developer's choice. In addition, there are no ink-enabled workflow designers.

In addition, existing systems fail to provide seamless ad-hoc or dynamic editing for executing workflows. Workflow processes are dynamic and mobile in nature and their form cannot be entirely foreseen at design time. The workflow processes start in a structured fashion and eventually evolve and change during the course of their execution lifetime. There is a need for a workflow authoring framework that allows workflow builders to author various types of workflow models at design time as well as make ad-hoc or dynamic changes to running workflows in a seamless manner. Even after a workflow process has been deployed and is running, changes in business requirements often force changing or editing the currently running workflow process. There is a need for a system that provides runtime authoring of a workflow process.

In addition, workflow processes deal with cross cutting orthogonal and tangled concerns that span multiple steps of a workflow process model. For example, while parts of the workflow process are designed to participate in long running transactions, other parts of the same process are designed for concurrent execution. Still other portions of the same workflow process require tracking, while other portions handle business or application level exceptions. There is a need to apply certain behaviors to one or more portions of a workflow process.

Some workflow modeling approaches are impractical as they require a complete flow-based description of an entire business process including all exceptions and human interventions. Some of these approaches provide additional functionality as exceptions arise, while other approaches exclusively employ a constraint-based approach instead of a flow-based approach to modeling a business process. Existing systems implement either the flow-based or constraint-based approach. Such systems are too inflexible to model many common business situations.

Accordingly, a componentized and extensible workflow model is desired to address one or more of these and other disadvantages.

SUMMARY OF THE INVENTION

Embodiments of the invention provide an extensible framework for building a componentized workflow model. In particular, each step of a workflow process has an associated component model that describes design time aspects, compile time aspects, and runtime aspects of the workflow step. Further, any developer may extend the core workflow model by authoring these components. The invention includes a workflow engine that is flexible and powerful enough to coordinate the execution of various kinds of workflows including highly formal machine-to-machine processes, constraint-based ad-hoc human workflows, and workflows having a mixture of flow-based and constraint-based approaches. The workflow engine permits activation, execution, query, and control capabilities against executing workflows. For example, the invention permits ad-hoc and dynamic changes to executing workflows. The workflow engine is rehostable or embeddable in a variety of host environments including both server and client environments. Each specific host environment marries the workflow engine to a set of service providers. The aggregate capabilities of the service providers determine the kinds of workflows that may be executed in the specific host environment.

Other embodiments of the invention provide a declarative format such as an extensible orchestration markup language (XOML) for serializing a workflow model. The declarative format enables a user to extend the workflow model by writing a set of components. The semantics corresponding to the various steps of a workflow process are encapsulated in an activity validator component which validates and enforces the semantics for a given component at compile time. Embodiments of the declarative format of the invention further enable the declaration and association of data with various elements of the workflow model. The declarative format supports the transformation of the data through the workflow. For example, the format represents external data sources such as databases or files, code snippets, and business rules within the workflow model declaratively.

An embodiment of the invention provides an extensible, customizable, and re-hostable workflow designer framework to build graphical/visual workflow designers to model different classes of workflows. Another embodiment of the invention supports a rapid application development style workflow design experience to allow users to graphically design a workflow process and associate business logic in any programming language. Embodiments of the invention also provide ink support using pen and tablet technologies. The invention provides a free form drawing surface in which a workflow drawn by a user is converted into an internal representation. The invention supports creation and modification of the workflows via ink editing on the existing drawing surface (e.g., add/delete activities), and ink annotation of existing workflows (e.g., comments, suggestions, or reminders hand-drawn on the design surface).

Still other embodiments of the invention provide components for capturing cross cutting behaviors in a declarative way and applying the behaviors to selected portions of a workflow model. Other embodiments of the invention execute the selected portions of the workflow model in the context of the behaviors associated therewith. Embodiments of the invention provide a framework, reusable components, and a language to deal with cross cutting orthogonal and tangled concerns that span multiple steps of a workflow process model.

In accordance with one aspect of the invention, a method models a workflow in a computer system having a display and a user interface selection device. The workflow includes activities and the workflow models a business process. The method includes displaying a plurality of activities on the display. The method also includes receiving a selection of the activities from a user via the user interface selection device. The method also includes displaying the received selection of activities on the display. The method also includes receiving structure information from the user via the user interface selection device. The method also includes arranging the displayed selection of activities on the display in accordance with the received structure information to create a workflow.

In accordance with another aspect of the invention, one or more computer-readable media have computer-executable components for modeling a workflow in a computer system having a display and a user interface selection device. The workflow includes activities and the workflow models a business process. The components include a rendering component for displaying a plurality of activities on the display. The components also include an interface component for receiving a selection of the activities displayed by the rendering component from a user via the user interface selection device. The rendering component further displays on the display the selection of activities received by the interface component. The interface component further receives structure information from the user via the user interface selection device. The component also includes a designer component for arranging the selection of activities on the display in accordance with the received structure information to create a workflow.

In accordance with yet another aspect of the invention, a system models a workflow. The workflow includes activities and the workflow models a business process. The system includes a memory area for storing a plurality of activities. The system also includes a display area for displaying the plurality of activities stored in the memory area. The system also includes a processor configured to execute computer-executable instructions for receiving a selection of the activities from a user, displaying the received selection of activities in the display area, receiving structure information from the user, and arranging the displayed selection of activities in the display area in accordance with the received structure information to create a workflow.

Alternatively, the invention may comprise various other methods and apparatuses.

Other features will be in part apparent and in part pointed out hereinafter.

BRIEF DESCRIPTION OF THE DRAWINGS

FIG. 9 is a high-level application user interface for authoring workflows that relies upon wizards for specification of the workflow.

Figure 1:
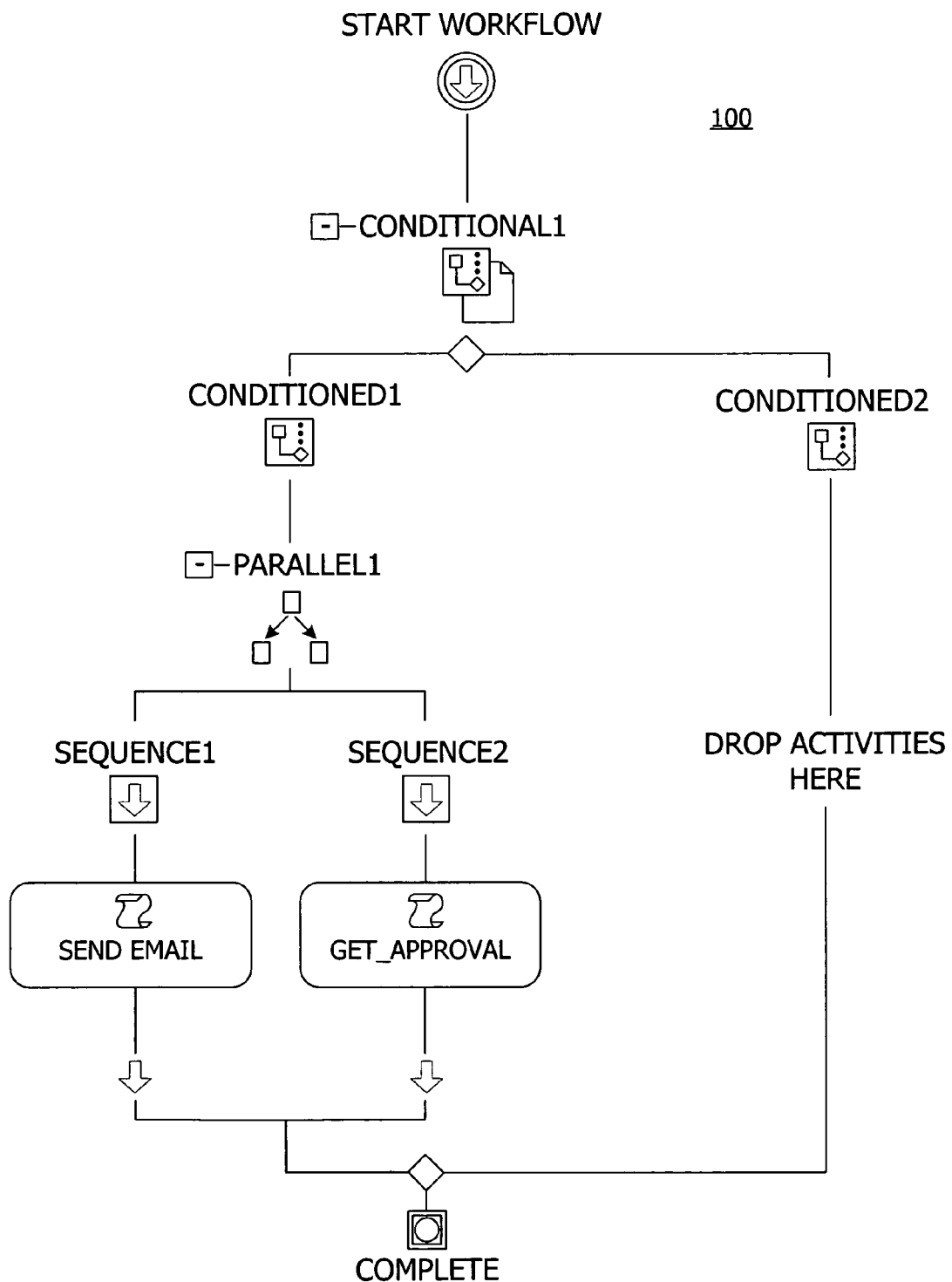
FIG. 1 is an exemplary workflow containing tasks and control flow composite activities.

Appendix A describes exemplary activities.

Appendix B describes the visual designer and associated activity designers.

Corresponding reference characters indicate corresponding parts throughout the drawings.

DETAILED DESCRIPTION OF THE INVENTION

Embodiments of the invention model a workflow representing a process such as a business process. Business processes are dependant and ordered tasks, activities, or the like that result in predictable and repeatable outcomes. Including an organization's operating procedures, institutional working knowledge, and information resources, business processes are designed to satisfy defined business objectives in an efficient and timely manner. In an efficient environment, the functional components of a process can be readily identified, adapted, and deployed to address ever-changing corporate requirements. The workflow is an end user's experience interacting with the tasks in a business process. Tasks are modeled as activities, components, or the like, each representing a unit of work that is performed by a person or machine. In one embodiment, a plurality of activities is presented to a user. The user selects and organizes the activities to create the workflow. The created workflow is executed to model the business process. Referring to FIG. 1, an exemplary workflow 100 contains tasks and control flow composite activities.

In one example, an orchestration engine workflow model supports modeling, authoring and executing different classes of workflows. Examples include modeling a given problem in terms of a structured set of steps that occur in an ordered sequence or as a set of asynchronous events. The orchestration engine coordinates the execution of schedules. A schedule is an organized set of activities that is arranged hierarchically in a tree structure. The execution context of, and the shared data visible to, an executing activity is provided by a scope. Each activity represents a component that encapsulates metadata for the step in a workflow process. The activity is the basic unit of execution in the workflow model and has associated properties, handlers, constraints and events. Each activity may be configured by user code in any programming language. For example, the user code may represent business or application logic or rules written in common language runtime (CLR) languages. Each activity supports pre-interception hooks and post-interception hooks into execution in the user code. Each activity has associated runtime execution semantics and behavior (e.g., state management, transactions, event handling and exception handling). Activities may share state with other activities. Activities may be primitive activities or grouped into a composite activity. A primitive or basic activity has no substructure (e.g., child activities), and thus is a leaf node in a tree structure. A composite activity contains substructure (e.g., it is the parent of one or more child activities).

In one embodiment, activities are of three types: simple activity, container activity and root activity. In this embodiment, there is one root activity in the model, and none or any quantity of simple activities or container activities inside the root activity. A container activity may include simple or container activities. The entire workflow process may be used as an activity to build higher-order workflow processes. Further, an activity may be interruptible or non-interruptible. A non-interruptible composite activity does not include interruptible activities. A non-interruptible activity lacks services that would cause the activity to block.

Figure 2:
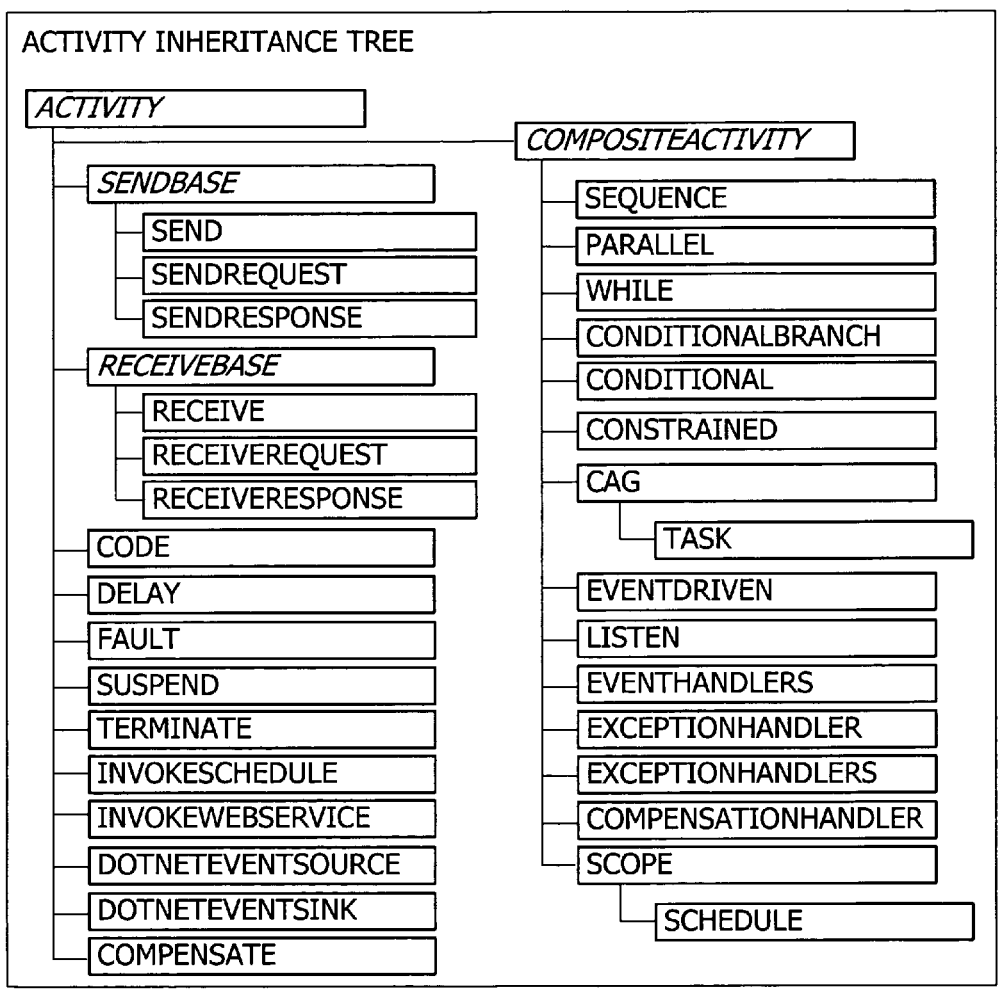
FIG. 2 illustrates an exemplary activity inheritance tree.

The orchestration engine provides an exemplary set of activities. Referring to FIG. 2, an activity inheritance tree illustrates exemplary activities. The exemplary activities listed in FIG. 2 are described in detail in Appendix A. In addition, any user may write one or more activities to extend the workflow model. For example, the user may write activities for a specific business problem, domain, workflow standard (e.g. business process execution language), or a target platform. The orchestration engine may provide a rich set of services to the user for writing activities which include, for example, services of analyzing code, type resolution and type system, services for serialization, and rendering.

In one embodiment, each activity has at least three parts: metadata, instance data, and execution logic. The metadata of the activity defines data properties that may be configured. For example, some activities may share a common set of metadata defined in an activity abstract base class. Each activity declares its own additional metadata properties according to its needs by extending this class.

The values of metadata properties will be shared by all instances of that activity across the instances of the schedule where the activity was configured. For example, if a user creates a schedule A and adds a send activity to it, the send activity is given identification information (e.g., "001") as part of its metadata. A second send activity added to the schedule would receive its own unique identification information (e.g., "002"). Once multiple instances of schedule A are created and executed, all instances of send "001" will share metadata values. In contrast, the instance data of an activity defines a set of data which is specific to the instance of the activity in a running schedule instance. For example, a delay activity may offer a read-only property on its instance data that is the date and time value representing the delay activity's timeout value. This value is available once the delay activity has begun executing, and it is most likely different for every single instance of the delay activity. It is common to refer to instances of schedules, and especially instances of activities and tasks, without qualifying the reference with "instance."

Composite activities have their set of child activities as another element. Child activities are considered metadata in one embodiment. The orchestration engine model explicitly permits manipulation of this metadata at runtime within an instance of the schedule. It is possible to add new child activities to a composite activity that is part of an executing schedule instance such that only the metadata (activity tree) for that schedule instance is affected.

Figure 3:
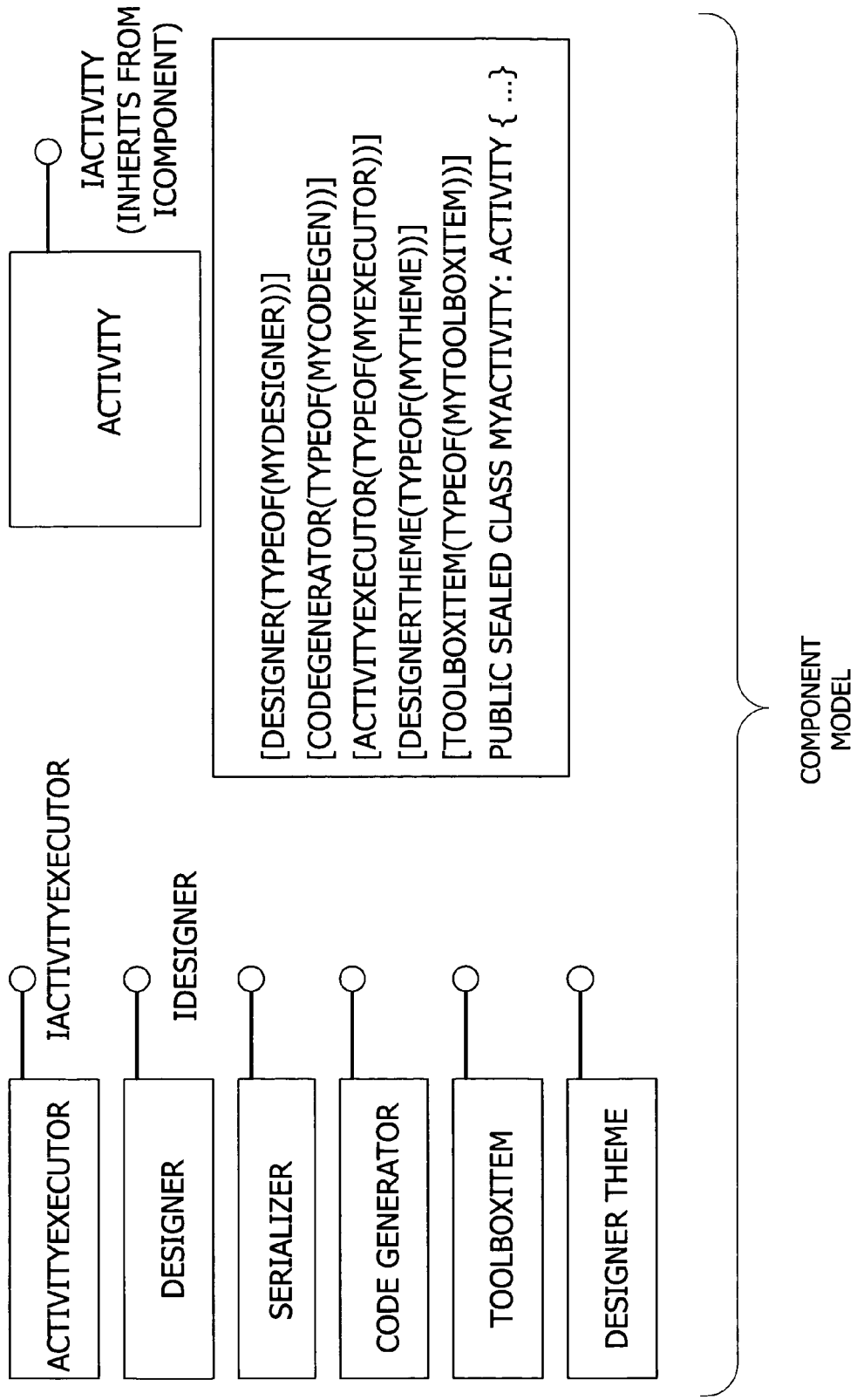
FIG. 3 illustrates an exemplary component model.

Referring next to FIG. 3, each activity has an associated set of components that forms the component model for the activity. The associated set of components includes an activity executor, an activity designer, an activity serializer, an activity validator (e.g., semantic checker), and an activity code generator. The activity executor is a stateless component that implements the execution semantics for the activity. The activity executor works with the metadata of an activity to implement the activity. A core scheduler acts as a service provider for the activity executor to provide services to the activity executor.

The activity designer visually displays the design time visual representation of the activity. The activity designer is a node in a designer hierarchy and may be themed or skinned. The activity designer is hosted in a design environment (e.g., an application program) and interacts with the host design environment via services. The activity validator enforces the activity semantics at compile time as well as runtime. The activity validator operates on the context of the workflow model and uses the services provided by the environment (e.g., compiler, designer, or runtime). Validation occurs at various points in the lifecycle of a workflow. Structural compliance checks are made when creating serialized representations of the workflow, when compiling, and in response to the user's request. The semantic checks may be stronger at runtime than those performed at compile-time to ensure the safety of a runtime operation such as the addition or replacement of an activity in the activity tree of a running instance. The invention evaluates semantics associated with each of the activities for conformance or compliance with, for example, predefined interface requirements.

The activity serializer is a component that serializes the metadata of an activity. The activity serializer is called from the various model/format serializers. The entire workflow model is serialized based on an extensible schema into a declarative markup language which may be further translated into other workflow languages as desired.

In one embodiment, the component model for an activity is stored as a data structure on a computer-readable medium. In the data structure, the activity designer is represented by an image field storing data (e.g., an icon) for visually representing the activity. In addition, one or more author time fields store metadata defining properties, methods, and events associated with the activity. The activity serializer is represented by a serializer field storing data for transferring the metadata stored in the author time fields to a declarative representation of the activity. The activity generator is represented by a business logic field storing software code associated with the metadata stored in the author time fields. The activity executor is represented by an executor field storing data for executing the software code stored in the business logic field.

Scopes and Schedules

The execution context of, and the shared data visible to, an executing activity is provided by a scope. A scope is one of the core activities. A scope is a unifying construct for bringing together variables and the state of a long-running service with transactional semantics, error-handling semantics, compensation, event handlers, and data state management. A scope may have associated exception and event handlers. In one embodiment, a scope may be transactional, atomic, long running, or synchronized. Concurrency control is provided for the user in cases of conflicting read-write or write-write access to user variables. A scope is also a transaction boundary, an exception handling boundary, and a compensation boundary. Since scopes may be nested within a schedule, it is further possible to declare variables, messages, channels, and correlation sets with the same name in different scopes (even if the scopes are nested) without name collision.

Scopes nested within a schedule are only executable within the context of that schedule. A schedule may be compiled either as an application (e.g., a standalone executable entity) or as a library (e.g., for invocation from other schedules). Every schedule that is compiled as a library effectively constitutes a new activity type that may be invoked from within other schedules. A schedule's metadata includes the declaration of parameters.

Once a schedule is developed, instances of the developed schedule may be executed. The process of activating and controlling a schedule instance is a function of the host environment in which the orchestration engine is embedded. The orchestration engine provides a no-frills "simple host" that may be used to test schedules. In addition, the orchestration engine provides an activation service to promote standardization of a "service provider" model (e.g., application programming interfaces) that is used alike by the engine and external applications for interacting with the service environment (i.e. host). The activation service creates a schedule instance of a particular schedule type, optionally passing parameters. The schedule instance is essentially a proxy to the running schedule instance and includes an identifier that uniquely identifies the instance, a reference to the metadata (activity tree) for the schedule, and methods to suspend, resume, and terminate the instance. The activation service also support finding a schedule instance based on a given schedule instance identifier.

Code-Beside

A scope activity may have an associated code-beside class that includes business logic for the scope activity. Since a schedule is itself a scope, a schedule may also have a code-beside class. Any scopes nested within a schedule may also have their own code-beside classes. The activities that are nested within a scope share the scope's code-beside class which acts as a container for their shared data state and business logic. For example, metadata for a code activity includes a reference to a method with a particular signature in the code-beside. In another example, metadata for a send activity includes an optional reference to a code-beside method of a particular signature plus mandatory references to a message declaration and a channel declaration.

Exemplary uses of code-beside include the following: declaration of variables, messages, channels, and correlation sets; declaration of in/out/ref parameters; declaration of additional custom properties; preparation of a message to be sent; processing of a message that has been received; implementation of a rule expressed in code that returns a Boolean value; manipulation of locally defined variables; reading activity metadata and instance data; writing activity instance data (e.g., setting a property on an activity about to be executed); raising an event; throwing an exception; enumerating and navigating the hierarchy of activities in the running schedule instance's activity tree, including across nested scopes and schedule invocation boundaries; adding new activities to a composite activity within the running schedule instance; changing the declarative rules associated with activities within the running schedule instance; and obtaining references to, and manipulating, other running schedule instances.

User Interface for Designing a Workflow

Figure 4:
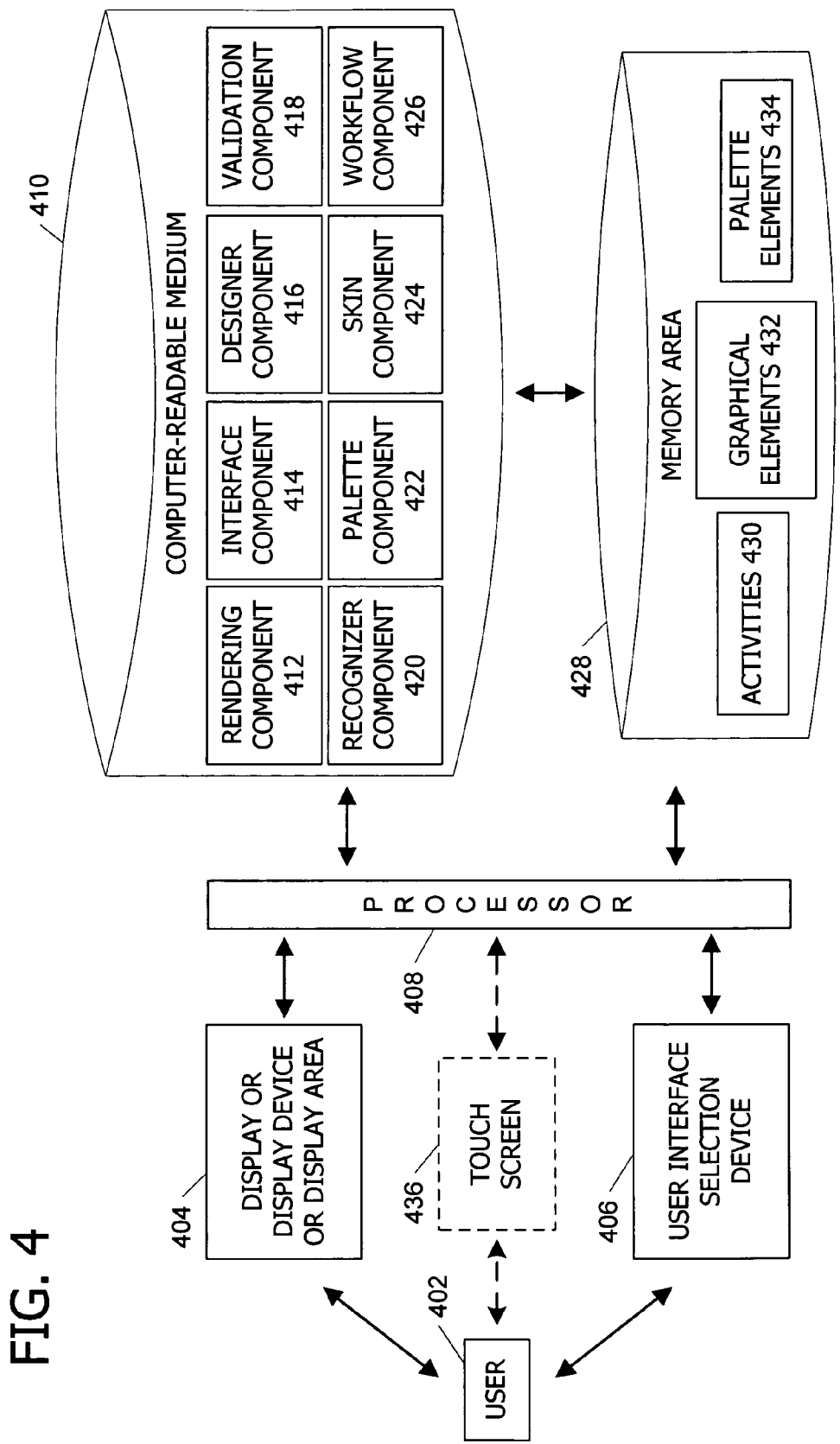
FIG. 4 is a block diagram illustrating the user interaction with the invention to create a workflow.

Referring to FIG. 4, a block diagram illustrates user interaction with the invention to create a workflow. A user 402 interacts with a display 404 (e.g., a display device, or a display area within an execution environment of an application program) and a user interface selection device 406 to design a workflow via computer-executable components. The computer-executable components for modeling the workflow are stored on one or more computer-readable media such as computer-readable medium 410 and include a rendering component 412, an interface component 414, a designer component 416, and a validation component 418. The rendering component 412 displays a plurality of activities on the display 404. The interface component 414 receives a selection of the activities displayed by the rendering component 412 from the user 402 via the user interface selection device 406. The rendering component 412 further displays on the display 404 the selection of activities received by the interface component 414. The interface component 414 further receives structure information from the user 402 via the user interface selection device 406. The designer component 416 arranges the selection of activities on the display 404 in accordance with the received structure information to create the workflow. The validation component 418 evaluates the semantics for conformance to a predefined interface requirement.

Figure 5:
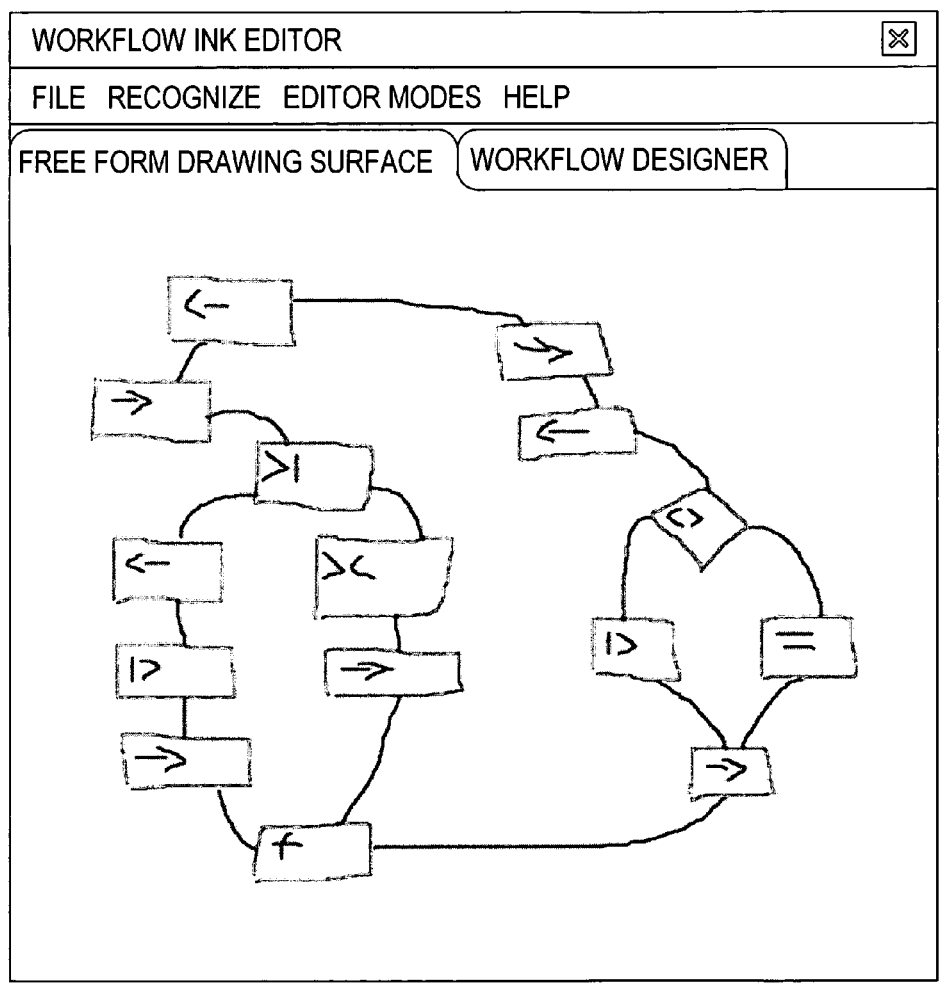
FIG. 5 illustrates an exemplary inked workflow.
Figure 6:
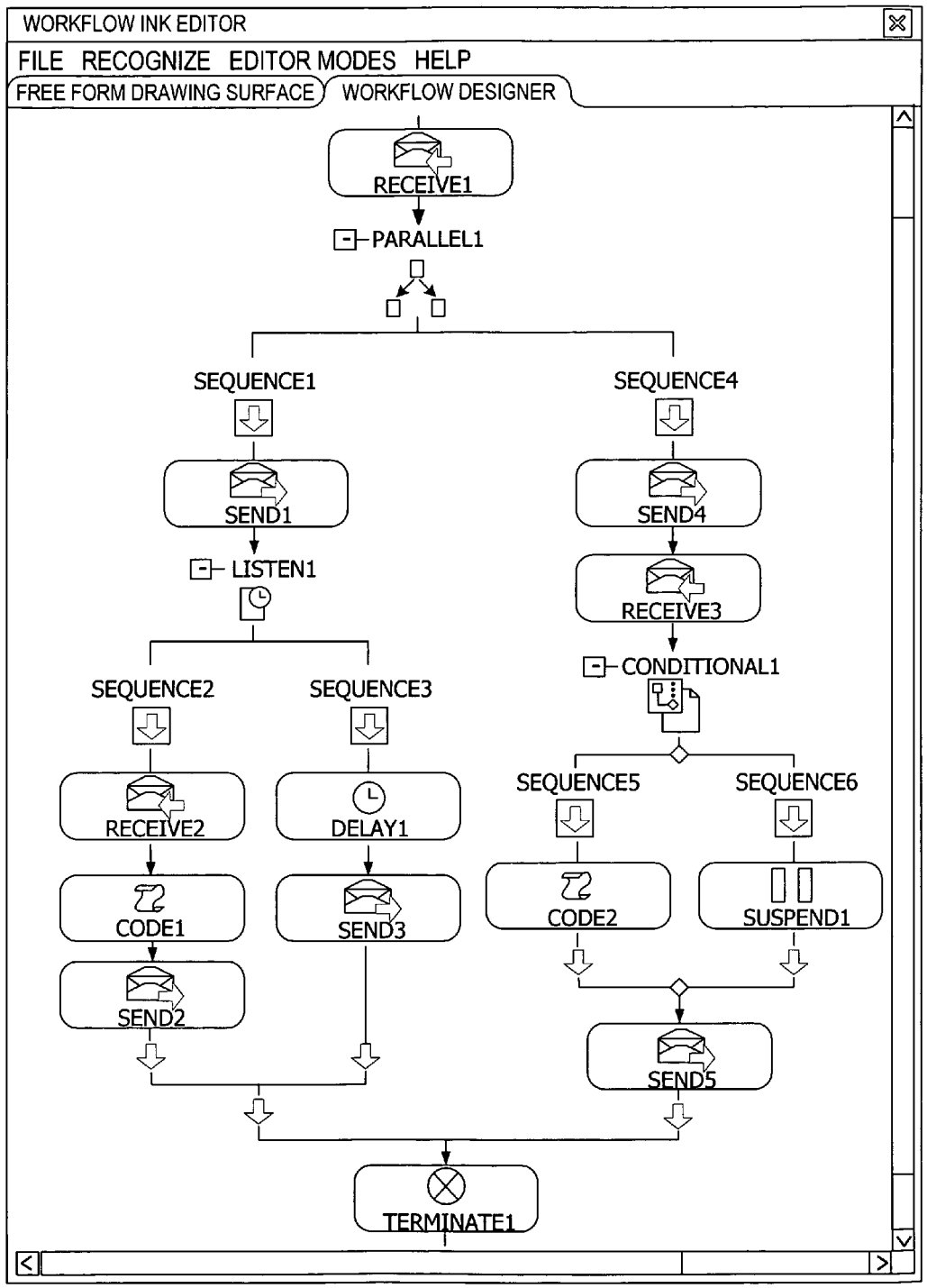
FIG. 6 illustrates a workflow converted from the inked workflow of FIG. 5.

In one embodiment, the invention is ink-enabled and includes a touch screen 436 for receiving a hand-drawn representation of a workflow from the user 402. The invention converts the hand-drawn workflow to a workflow. An exemplary inked workflow is shown in FIG. 5. After the user 402 selects "auto-recognize," the workflow is converted into the workflow shown in FIG. 6. The ink-enabled embodiment enables the user 402 to build workflow designers compatible with tablet computing devices. The ink-enabled workflow designer allows the user 402 to use a pen, pointing device, or the like throughout the workflow creation process (e.g., from the initial sketch stages to the execution and post-execution stages including analysis of tracked data). In such an embodiment, the computer-executable components further include a palette component 422, a recognizer component 420, a skin component 424, and a workflow component 426. The palette component 422 defines a plurality of palette elements. Each of the defined plurality of palette elements corresponds to at least one of the activities. The interface component 414 receives a plurality of graphical elements from the user 402 via the touch screen 436. The received plurality of graphical elements is arranged to create a workflow. The recognizer component 420 associates each of the plurality of graphical elements received by the interface component 414 with one of the palette elements defined by the palette component 422 and arranges the associated palette elements to display the workflow on the touch screen 436. The skin component 424 applies the received user-defined theme to the workflow displayed on the touch screen 436. The workflow component 426 creates the workflow in accordance with the associated palette elements arranged by the recognizer component 420.

In particular, the user 402 sketches the process graphically on the tablet computing device. The invention supports various process definitions swim lanes for interacting processes and process constructs such as parallel, decision, loops, and event/activation conditions. Software of the invention then converts the graphical sketch into the process definition either on the fly during sketching or after the sketch has been completed by the user 402. The graphical sketch may then be replaced on the display 404 with a workflow having standard symbols and elements. The user 402 is able to edit the displayed workflow, add or delete a comment for the workflow (e.g., single- or multi-user scenarios), and make corrections to the displayed workflow elements. In particular, the user 402 may make annotations by drawing or writing comments, notes, and/or reminders over an existing workflow and the invention stores the ink along with the workflow representation and the position of the ink relative to the surrounding shapes.

Further, the user 402 may modify the process definition either by drawing additional sketches, by drawing standard gestures that are interpreted as editing (e.g., delete, copy, move), or by inserting a specific activity type. The invention also supports round-tripping between the drawing and the process definition. For example, the process definition is updated when the drawing changes, and vice versa.

The invention stores the drawing along with the created process definition. In one embodiment, this may be used to show process execution progress on the user drawing. For example, a business analyst draws a workflow and gives it to a developer who converts the workflow into a process definition, compiles it, and starts process execution. The business analyst looks at the executing process either in a process definition view or in a drawing pane.

The invention also enables the user 402 to interact with a running (e.g., executing) workflow via drawing and/or writing. For example, the user 402 may control execution of running processes in a management view (e.g., start/stop/terminate) or communicate with the workflow by writing inputs with a pen, pointing device, or the like. Gestures recognized by the invention such as to delete or insert certain shapes are not limited to a predefined set of gestures. That is, the user 402 may create custom gestures for the invention software to recognize.

In one embodiment, the invention is embodied as a standalone application targeted at a business analyst. In another embodiment, the invention is embodied as a workflow designer for use in an application program. That is, the components illustrated in FIG. 4 execute within an execution environment of an application program.

In another embodiment, a processor 408 is configured to execute computer-executable instructions for modeling the workflow and has access to a memory area 428. The memory area 428 stores a plurality of activities 430. The processor 408 executes the computer-executable instructions to receive a selection of the activities 430 from the user 402, display the received selection of activities 430 on the display 404, receive structure information from the user 402, and arrange the displayed selection of activities 430 on the display 404 in accordance with the received structure information to create a workflow.

In an embodiment including the touch screen 436 or other display such as display 404 receptive to a pointing device or the like, the memory area 428 further stores a plurality of graphical elements 432 received from the user 402 via the display 404 and, optionally, the pointing device. The graphical elements 432 are arranged by the user 402 to represent a workflow. The memory area 428 further stores a plurality of palette elements 434 each corresponding to at least one of the activities 430. In such an embodiment, the processor 408 is further configured to execute computer-executable instructions for mapping each of the graphical elements 432 stored in the memory area 428 to one of the plurality of palette elements 434, creating the workflow as a function of the mapped palette elements 434, and displaying the workflow on the display 404.

The elements illustrated in FIG. 4 constitute exemplary means for displaying the plurality of activities such as activities 430, exemplary means for receiving the selection of the activities, exemplary means for receiving the structure information from the user 402, and exemplary means for arranging the displayed selection of activities in accordance with the received structure information to create a workflow. Further, the pointing device constitutes exemplary means for communicating information via a digital pen or a stylus or the like, the display 404 constitutes exemplary means for receiving input from a digital pen or a stylus or the like, and the processor 408 constitutes exemplary means for receiving the plurality of graphical elements such as graphical elements 432 from the user 402 and creating a workflow as a function thereof.

Figure 7:
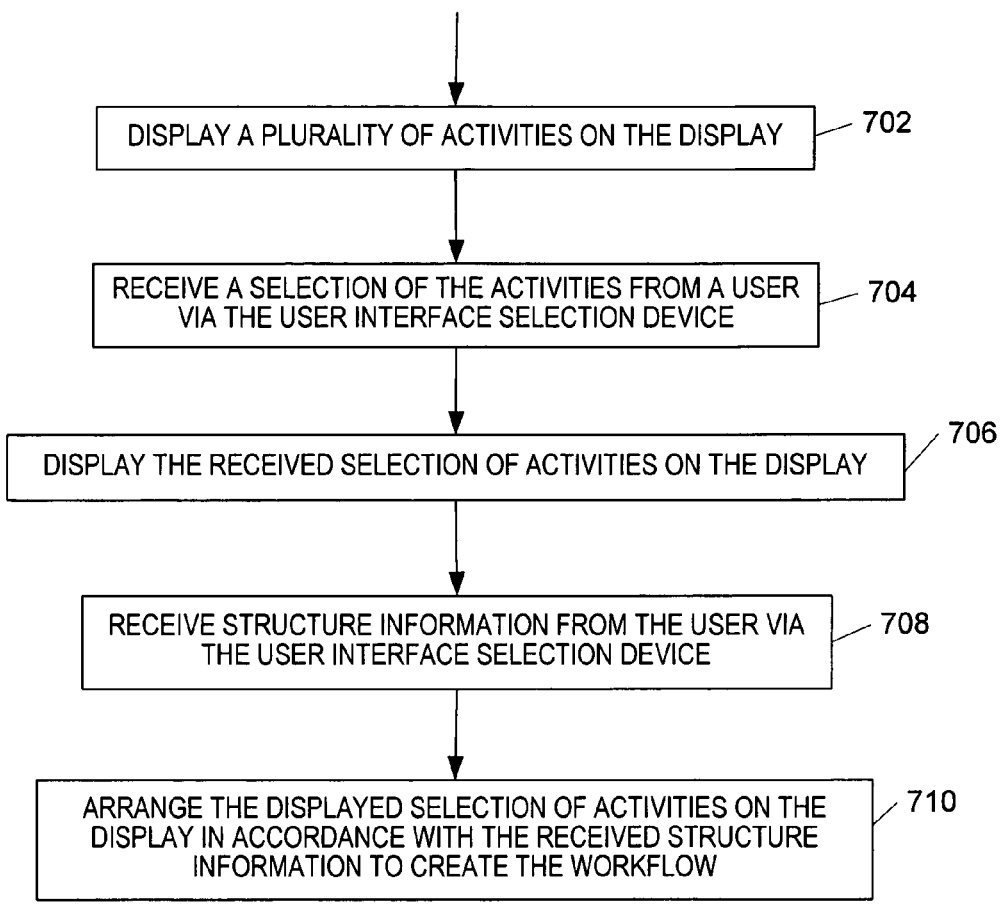
FIG. 7 is a flow chart illustrating the user interaction with the invention to create a workflow.

Referring again to FIG. 4 and next to FIG. 7, a flow chart illustrates a method for modeling a workflow. The method includes displaying a plurality of activities 430 on the display 404 at 702, receiving a selection of the activities 430 from the user 402 via the user interface selection device 406 at 704, displaying the received selection of activities 430 on the display 404 at 706, receiving structure information from the user 402 via the user interface selection device 406 at 708, and arranging the displayed selection of activities 430 on the display 404 in accordance with the received structure information to create the workflow at 710. In one embodiment, displaying the plurality of activities 430 includes displaying the plurality of activities 430 in a palette display area and/or a workspace display area on the display 404.

Figure 8:
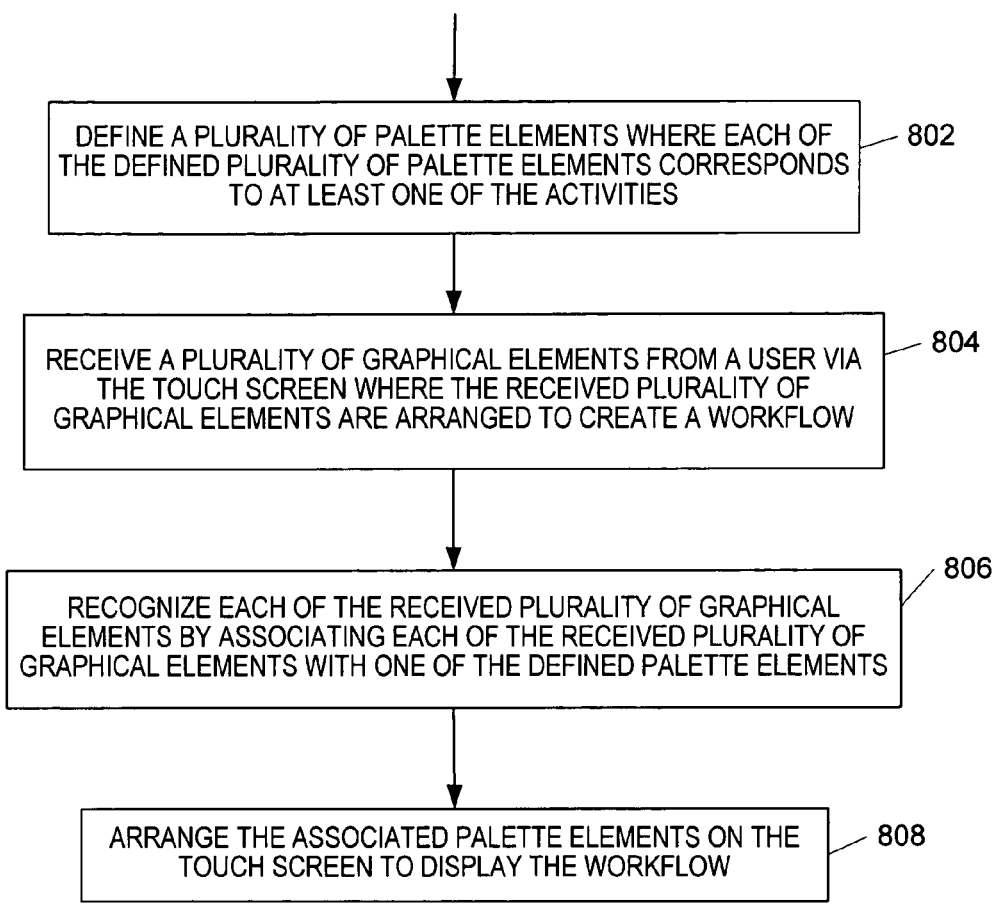
FIG. 8 is a flow chart illustrating the recognition of an inked workflow in a touch screen embodiment.

Referring next to FIG. 8, in a touch screen embodiment, the method further includes defining a plurality of palette elements where each of the defined plurality of palette elements corresponds to at least one of the activities at 802, receiving a plurality of graphical elements from a user via the touch screen where the received plurality of graphical elements are arranged to create a workflow at 804, recognizing each of the received plurality of graphical elements by associating each of the received plurality of graphical elements with one of the defined palette elements at 806, and arranging the associated palette elements on the touch screen to display the workflow at 808.

In one embodiment, one or more computer-readable media such as computer-readable media 410, 428 have computer-executable instructions for performing the method illustrated in FIG. 7 and FIG. 8.

Workflow Stencils

A workflow stencil (e.g., a workflow template or an activity package) includes a root activity and a set of activities. Stencils may be domain and or host specific. Examples of the former include a structured workflow stencil, human workflow stencil, and an unstructured workflow stencil. Some stencils may be "closed" as a set of activities including one or more roots designed to work together, possibly in a particular host environment. Other stencils may be "open", to varying degrees. A stencil defines its extensibility points. For instance, a developer writes a CustomRoot and a new abstract CustomActivity and declares that the package is CustomRoot plus any activity that derives from CustomActivity.

An exemplary BPEL or XLANG/S stencil includes a root activity with the following characteristics: participates in state management and transactions, has associated event and exception handlers, supports contract first model, may be analyzed, and has well-defined activation and termination behavior. The exemplary stencil further includes a set of messaging specific activities (e.g., Send and Receive and their variants) and other structured activities such as Scope, Loop, Condition, Listen, and Throw.

An exemplary Halifax Stencil includes a root activity with the following characteristics: implicit state management, associated exception handlers (0-n), supports event based model, has well defined activation behavior, and has undefined termination. The root activity contains 0-n EventDriven activities. Each EventDriven Activity represents a Halifax Action. Each EventDriven Activity has an associated state management protocol and executes in an atomic scope.

Designer Framework (User Interface)

The orchestration engine provides a framework for designing various classes of workflow models in a WYSWYG fashion. For example, referring to FIG. 9, a high-level application user interface for authoring workflows relies upon wizards for specification of the workflow. The framework includes a set of services and behaviors that enable developers to write visual workflow designers. These services provide an efficient way of rendering a workflow process, support for Ink/Tablet for drawing the flows, and support for designer operations such as undo/redo, drag/drop, cut/copy/paste, zoom, pan, search/replace, bookmarks, adornments, smart tags for validation errors, valid drop-target indicators for activities, auto layout, view pagination, navigation markers, drag indicators, print and preview with headers/footers, etc. Through such a user interface, simple workflows containing tasks and control flow composite activities (e.g., sequence, parallel, and conditional) may be constructed. No input of code (or reliance upon existing compiled code) is required either for rule specification (e.g., conditional branching logic, while looping logic) or dataflow specification (e.g., the output of task A is input to task B). The serialized representation of a schedule (including rules and dataflow) is self-contained and complete in some scenarios where no code-beside is required.

Figure 10:
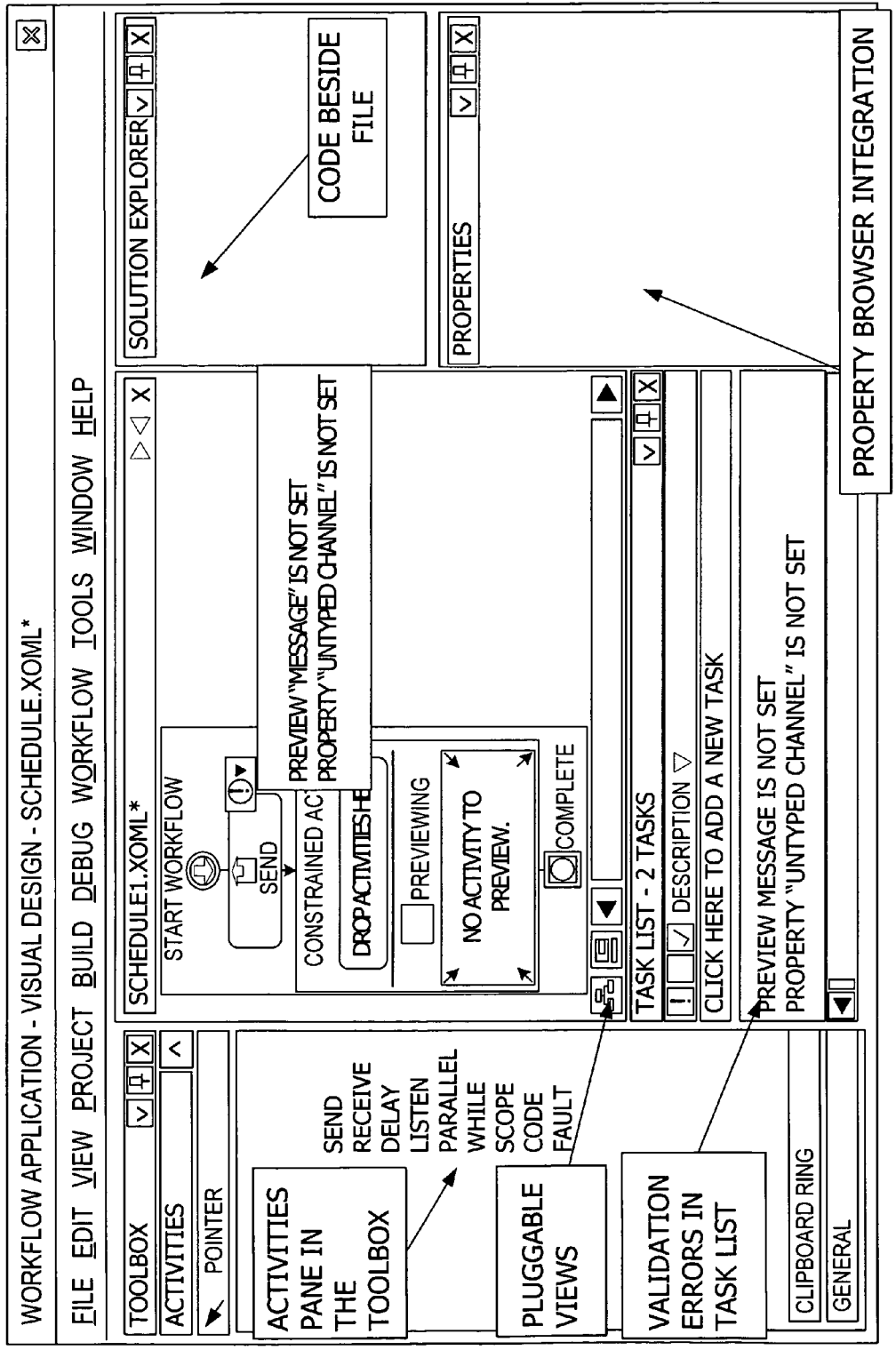
FIG. 10 illustrates an exemplary workflow designer.

Using the designer framework of the invention, the orchestration engine of the invention includes a rapid application development (RAD) style visual workflow designer with support for associating software code with the workflow model in a visual way. Each activity in the workflow has an associated activity designer. Each activity designer is written in terms of framework services. The framework of the invention also contains a visual designer model. The visual designer model includes a set of activity designers linked with one another via relationships described in the workflow model. FIG. 10 illustrates an exemplary workflow designer. The visual designer and activity designers are described in detail in Appendix B. The invention includes various modes of associating code with the workflow model including "Code-Beside", "Code-Within" and "Code-Only" which enables round-tripping of the user code to the workflow model in real time. The invention also provides real-time semantic errors while the user is building the workflow.

The orchestration engine designer allows the user to recursively compose higher order schedules by using other created schedule and using them. The inline expansion of schedules allows the user to view the schedule contents inline and cut or copy the contents. To enable the inline expansion of the schedule and to make the schedule read only, a separate design surface and designer host for the inline schedule is created. Further, the composite schedule designer has its own hierarchy. The invoked schedule is loaded and displayed when the designer is expanded by the user. In one embodiment, the designer is collapsed when the activity is dropped or copied on the design surface. A property chains the calling activity designer with the root designer of the hosted schedule. The following functions prevent the adding and removing of activities from the designer.

internal static bool AreAllComponentsInWritableContext (ICollection components)

internal static bool IsContextReadOnly(IServiceProvider serviceProvider)

These functions are called by the infrastructure to check if the context in which the activities are being inserted is writable. For the hosted designer these functions return false. In addition, properties are prevented from being modified. Other functions fetch the activity designers from the appropriate components:

internal static ServiceDesigner GetSafeRootDesigner(IServiceProvider serviceProvider)

internal static ICompositeActivityDesigner GetSafeParentDesigner(object obj)

internal static IActivityDesigner GetSafeDesigner(object obj)

In one example, a user creates a schedule and compiles it as activity. On successful compilation, the schedule appears on the toolbox. The user opens or creates the schedule in which use of the compiled schedule is desired. The user drags and drops the compiled schedule from the toolbox. A collapsed schedule designer is shown on the design surface. When the user wants to view the contents of the compiled schedule which was dropped, the user expands the schedule designer to show the contents of the invoked schedule inline in a read only state. The inlining of the called schedule enables the user to view the invoked schedule without switching between different schedule designers. The feature is useful to developers composing higher order schedules by reusing existing schedules.

Support for Customization of the Designer Framework Using Themes/Skins

A workflow designer written using the designer framework may be customized using workflow themes. These may be extensible markup language (XML) files which declaratively describe various aspects of the designer. The workflow designer provides wizard support for partners to extend activities. Exemplary user interface features supported by the workflow designer include, but are not limited to, undo/redo, drag/drop, cut/copy/paste, zoom, pan, search/replace, bookmarks, adornments, smart tags for validation errors, valid drop-target indicators for activities, auto layout, view pagination, navigation markers, drag indicators, print and preview with headers/footers, and document outline integration. The workflow designer supports custom designer themes/skins to enable customizing the look and feel of the designer using XML metadata. For example, the workflow designer receives customization information from the user. The workflow designer supports background compilation. In one example, smart tags and smart actions are provided for validation errors while designing the schedule. The workflow designer may be hosted in any container (e.g., application programs, shells, etc.).

Figure 11:
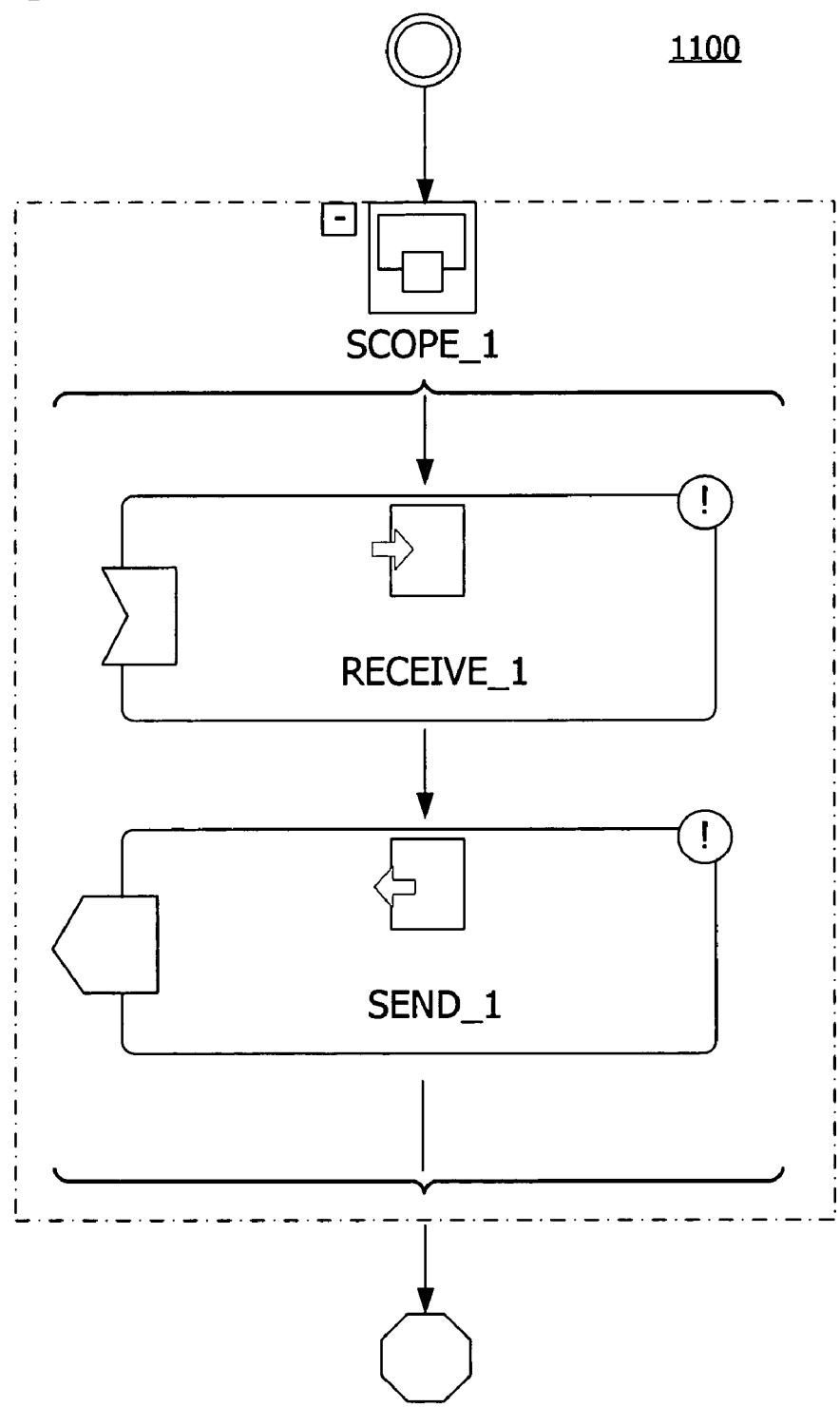
FIG. 11 illustrates an orchestration program including a receive activity followed by a send activity.

An exemplary orchestration engine program includes a receive activity followed by a send activity. The process receives a message and sends it out. The user creates a project called "Hello World" and adds an orchestration item to the project. The user then drags and drops a scope activity onto the design surface. Next, the user drops a receive activity followed by a send activity onto the scope. FIG. 11 illustrates the resultant workflow 1100 in the designer. Each activity designer provides a user interface representation on an object model. Developers are able to directly program the object model and set properties on activities or use the designer. The orchestration engine designer allows a developer to select an activity from the toolbox and drag it onto the designer surface. If the activity has already been placed into a schedule and needs to be moved, the developer is able to select it (by clicking on it) and drag it to the area of the schedule where it needs to go. If a developer hold the control key while dragging and dropping, a copy of the selected activities selected are made.

Active placement provides possible drop points (targets) as visual indicators on the design surface. Auto scrolling also participates within the context of drag and drop. When dealing with large schedules, navigation to areas of the designer currently not in the view port are accessible by dragging the activity towards the area of the schedule to be placed.

Drag and drop is supported across schedules in the same project and across schedules in other projects in the same solution. After an activity has been placed onto the design surface, the developer configures the activity. Each activity has a set of properties that a developer configures in order for the schedule to be valid. These properties are editable in the property browser. Every activity controls what properties are viewable in the property browser. To aide the developer in configuring various activities, the designer provides a variety of dialogs or "sub-designers". Each of the dialogs is invoked for various properties of activities.

The orchestration engine is able to customize the activities presented in the toolbox. When a developer creates a custom activity or schedule, the end result is an assembly. Using a dialog, a developer is able to browse to the assembly location and select the assembly to make it appear as an orchestration engine activity. Alternatively, a developer may place the assembly in the orchestration engine installation path and it will be present as an orchestration engine activity.

Application Programming Interfaces (APIs)

In another embodiment, the invention provides application programming interfaces (APIs) for performing various workflow operations.

Hardware, software, and one or more application programming interfaces constitute exemplary means for authoring the workflow, exemplary means for selecting one or more of the activities to create the workflow, exemplary means for serializing the workflow, exemplary means for customizing a visual appearance of the workflow, exemplary means for validating the workflow, exemplary means for compiling the workflow, and exemplary means for associating a type with each of the activities in the workflow.

Activity Execution Framework

With the exception of schedule and scope, the engine views activities as abstract entities and simply coordinates the execution of activities without knowing the specific data or semantics of any particular activity. In one embodiment, four entities interact during the execution of an activity: the activity itself, a parent activity of the activity that is executing, the scope enclosing the activity that is executing, and the orchestration engine. Each entity has a different function.

If the execute method of an activity returns without having signaled completion to its activity coordinator, the activity is said to be in a logical waiting state. Such an activity may be cancelled by the orchestration engine, or continued (e.g., once the item or event on which it is waiting becomes available or occurs, and the activity is notified of this by the engine).

Some activities which never enter the logical waiting state may never be cancelled. Examples include the send activity and the code activity since they execute without any demands on external events or subscriptions. Once handed a thread (i.e. once their execute method is called by the orchestration engine), these activities will do work until done. The orchestration engine is never given an opportunity to cancel them since they do not return the thread until they signal completion.

The orchestration engine runtime uses rules to trigger events on which orchestration engine activities are executed. The orchestration engine designer provides the user ability to associated rules to be evaluated at runtime to trigger events. The orchestration engine designer enables the user to use different types of rules technology by providing extensibility architecture. The designer is agnostic to the type of rules technology used.

In one embodiment, the designer supports Boolean expression handlers as a way to associate a rule with an activity. This means that in the user code file; the user writes a method which returns a true or false value; based on which the rule is triggered. Currently there are multiple technologies which may also be used to evaluate rules including Info Agent and Business Rules Engine (BRE). To achieve this, the designer includes an extensibility architecture which enables the rule technology developers to host custom user interfaces in the designer. The designer provides a way to the custom user interface writers to serialize the rules in the form of code statement collection. The designer emits a Boolean handler in user code file with the code statement collections inserted into it. The orchestration engine includes a default user interface which may also be used by the rule writers. A rule technology provider add rules to the orchestration engine designer by creating a custom rule declaration, writing a user interface type editor associated with the custom rule declaration, creating a custom user interface to host the rules user interface, and generating code statements on save.

In one example, a user selects the activity designer with which rule needs to be attached, locates the rule property in the property browser and selects the "RuleExpressionHandler" in the drop down (which makes the "Statements" property to appear underneath the Rule Property in the user interface), specifies the user code method name in the "Statements" property, invokes a user interface type editor to invoke a dialog which will host rules specific user interface, and defines rules in the dialog by creating new predicate rows and grouping them together. The user interface emits a method in the user code file. The method name will be same as the one specified by the user in the property browser. The code statements equivalent to creating the rule will be inserted in the user code method for rule.

Messaging During Execution

In a running workflow, messages sent to a schedule are intended for a specific schedule instance. For example, an invoice for purchase order #123 must be sent back to the same schedule instance that originated (e.g., sent out) that purchase order. To match an inbound message with the appropriate schedule instance, the message and the schedule instance share a correlation set. The correlation set may be a single-valued correlation set in which means an identifier field in the message is matched against an identifier of the same type that is held by schedule instances. Multi-property correlation sets are also possible and analogous to multi-column primary keys in a database table.

The correlation set value held by a schedule instance is initialized when the schedule instance sends out a message (e.g., the value may be taken from an identifier field of an outbound purchase order) or receives a message. This correlation set value is then a part of that schedule instance's state. When a subsequent inbound message arrives, the correlation set value held in the schedule instance state is matched against the identifier held by an inbound message of the expected type. When a match is found, the correlation set is satisfied and the message is delivered to the schedule instance.

Although the implementation of correlation sets is a function of the orchestration engine and host environment, the user in one embodiment declares the correlation sets to make the schedule instance work correctly. In another embodiment, some activities (e.g., SendRequest/ReceiveResponse activities and ReceiveRequest/SendResponse activities) set up the correlation sets independent of the user. A wide range of validation checks are performed by the send and receive activities to ensure that correlation sets are initialized and followed properly.

Dynamic Editing of Executing Workflows

The orchestration engine provides a framework for authoring (and subsequently visualizing and executing) various types of workflows. Examples include event-condition-action (ECA) style workflows or structured flows or rules driven flows. Further, regardless of the way the workflow was modeled, the framework allows the users to author or edit workflows in the same manner at design time or even when the workflow process is running without the need for recompiling the workflow process. The framework allows the user to roundtrip between the runtime and the design time representation with hi-fidelity. Ad hoc changes are the changes made at run time to the process model. A user may ask a running instance for its schedule model and make changes to the model. For example, the user may add, remove, or replace activities in a batch, then commit or rollback the batched changes. In one embodiment, the model is validated after the updates. In many workflow scenarios of the invention, there is a blurring of, or even an elimination of, the separation between "design-time authoring" and "runtime execution."

A schedule instance effectively shares with other instances the activity type (metadata) tree defined for those instances' schedule type. But any schedule instance, once it begins executing, may be changed on the fly via the addition of new activities or the manipulation of declarative rules. It is possible to take such a modified schedule instance and "save as" as a new schedule type or more generally, to simply recover the serialized representation from the instance. That is, a running schedule instance may be serialized and then brought into any designer (e.g., authoring environment) or runtime visualization tool.

Further, it is possible for an advanced developer to author a schedule entirely as software code. To author a schedule type directly, the developer simply includes a static method called InitializeScheduleModel in the software code in the code-beside class for the schedule and marks this method with a [ScheduleCreator] attribute. In one embodiment, the static method takes no parameters and returns a Schedule object. There is no companion serialized file, though the serialized representation of the schedule may be recovered from the Schedule object that is created. Although this means that a schedule may be developed using a single software code file, validation checks may not be performed on the file. The orchestration engine compilation ensures the structural and semantic validity of the activity tree that underlies the schedule type. In another embodiment, compilation and validation run internally to produce the actual type that is executed, but no code input is required. Schedule type compilation becomes a very light process since there is no translation from a compile-time object model to a runtime object model. In essence, compilation simply combines the object model representation of a schedule with code-beside to produce a new type. In one embodiment, there may be no fundamental need to provide any code-beside at all for a particular schedule if the compiled code-beside matches what is demanded by the activities in the object model or code-beside may already exist in compiled form (an assembly).

When compiling a serialized schedule, it is possible to point to an existing compiled type that effectively serves as the code-beside for the schedule. A derivative of this compiled type is created and this new type serves as the code-beside to ensure that a unique type is created to represent the new schedule.

Serialization Architecture

The serialization infrastructure provides a modular, format neutral and easily extensible mechanism to serialize the orchestration engine activity tree.

In particular, a caller (e.g., an application program or a user) requests a serializer for an object (or activity) A from the serialization manager. The metadata attribute of object A's type binds object A to a serializer of the requested type. The caller then asks the serializer to serialize object A. Object A's serializer then serializes object A. For each object encountered while serializing, the serializer requests additional serializers from the serialization manager. The result of the serialization is returned to the caller.

Every activity in the orchestration engine component model may participate in serialization. The serializer component is not a part of activity class itself in one embodiment. Instead, the component is specified by annotating a serializer attribute in a class associated with the activity. The serializer attribute points to a class which is used to serialize objects of that activity type. In another embodiment, provider components for an activity type override the default serializer provided by the activity.

Designer serialization is based upon metadata, serializers, and a serialization manager. Metadata attributes are used to relate a type with a serializer. A "bootstrapping" attribute may be used to install an object that provides serializers for types that do not have them. A serializer is an object that knows how to serialize a particular type or a range of types. There is a base class for each data format. For example, there may be an XmlSerializer base class that knows how to convert an object into XML. The invention is a general architecture that is independent of any specific serialization format. The serialization manager is an object that provides an information store for all the various serializers that are used to serialize an object graph. For example, a graph of fifty objects may have fifty different serializers that all generate their own output. The serialization manager may be used by these serializers to communicate with each other when necessary.

In one embodiment, the use of serialization providers coupled with serializers that use generic object metadata provide a callback mechanism where an object is given the opportunity to provide a serializer for a given type. A serialization manager may be given a serialization provider through a method such as AddSerializationProvider. A serialization provider may be automatically added to a serialization manager by adding an attribute such as DefaultSerializationProviderAttribute to the serializer.

In one embodiment, the format is dictated by the following rules: an object is serialized as an xml element, a property of an object is categorized as simple property (e.g., serialized as an xml attribute) or complex property (serialized as child element), and a child object of an object is serialized as child element. The definition of a child object may differ from an object to another object. The example below is the serialization of a while activity, which has a Send activity as one of its child objects.

```
<While ID="while1">
  <ConditionRule>
    <CodeExpressionRuleDeclaration>
      <Expression Name="whileCondition" />
    </CodeExpressionRuleDeclaration>
  </ConditionRule>
  <Send HasTypedChannel="True" ID="send1">
    <Message Name="msg1" Type="System.UInt32" />
    <OnBeforeSend Name="onBeforeSend1" />
    <TypedChannel Type="System.Collections.IList"
    Operation="AddIndex"
Name="Foo" />
  </Send>
</While>
```

In an embodiment in which the language used for serialization is XOML, each XOML element is serialized to its respective object when the schedule is compiled. Objects include both simple and complex types. The mapping between the XOML representation of each activity and its mapping to the authoring object model is next described. Serialization of XOML varies between Primitive and Composite activities.

Simple types for primitive activities are serialized as attributes on the activity type. Complex types for primitive activities are serialized as child elements. As an example, here is the XOML representation of a Send activity.

```
<Send ID="send1" HasTypedChannel="False">
  <Message Name="message1" Type="System.String" />
  <UntypedChannel Name="c1" />
</Send>
```

In a similar manner to primitive type serialization, simple types for composite activities are serialized as attributes on the activity type. However, by definition, composite activities encapsulate nested activities. Each nested activity is serialized as another child element. As an example, here is the XOML representation of a While activity.

```
<While ID="while1">
  <ConditionRule>
    <CodeExpressionRule>
      <Expression Name="test" />
    </CodeExpressionRule>
  </ConditionRule>
</While>
```

A strong relationship between the process/workflow view and the serialized representation exists. When authoring in either the serialized (e.g., XOML) representation of the workflow or the code-beside of the workflow, the other will incur changes. Thus, modifying the XOML for an activity (or its constituent parts in cases of composite activities) is directly reflected in the process/workflow view when a developer switches between the two. The converse is also applicable. Modifying the activity in the process/workflow view results in the appropriate modification within XOML. As an example, the deletion of an activity in the process/workflow view results in the removal of the XML element in XOML for the same activity. Round tripping also occurs between the process/workflow view and the code beside.

During creation of the XOML code, if the XOML definition does not conform to a pre-defined interface requirement, the offending XML element is underscored or otherwise visually identified to the developer. If the developer switches to the process view, they will be alerted that there is an error within the XOML and the designer provide a link where the developer may click and will be navigated to the offending element. This same error appears in the task pane and upon doubling clicking on the error, the developer will be navigated to the offending element in the XOML.

Creating the Activity Tree from a XOML File (Deserialization)

In one embodiment, a CreateEditorInstance( ) function creates a DesignSurface object and then calls a BeginLoad( ) function onto the DesignSurface object passing the actual loader object into it, which eventually ends up in a BeginLoad( ) call to a DesignerLoader( ) function. A PerformLoad( ) function reads the text buffer object and deserializes it to the orchestration engine component model hierarchy. The invention walks through the hierarchy and inserts the activities into the design surface to load the components in the visual studio.

The invention also listens to changes to the XOML file to track the hierarchy and item identification changes to update the values in the visual studio cache. A secondary document data list includes a list of secondary documents, invisible to the user, on which orchestration engine designer works. For example, it is possible that user has not opened the code beside file, but when the user makes changes in the orchestration engine designer, the changes are made to the code beside file. As this file is not visible to the user, the file is maintained as a secondary document. Whenever the XOML file is saved, the secondary documents are automatically saved. If the name of one of these files changes or if the file is deleted, the invention updates the corresponding secondary document objects accordingly.

Exemplary deserialization guidelines for an object tree are as follows. An xml element is first treated as a property of parent object. If the parent object does not have a property with the element's tag name then the element is treated as a child object of the parent object. An xml attribute is treated as simple property on the parent object.

In an exemplary deserialization using the serialized code above, a <While> element is treated as an object created using the xml namespace information. A <ConditionRule> element is treated as a property of the While activity. The <CodeExpressionRuleDeclaration> element is treated an as object whose value will be applied to the ConditionRule property. The <Send> element is first tried as a property of the While activity, but the 'While' activity does not have a property with the name 'Send', so the <Send> element is treated as an object and added as the children activity of the while activity. The <Message> element is treated as a property of the Send activity. Because the Message property on Send is read only, the contents of Message element are considered as the contents of Message object. A similar rule applies to the deserialization of <OnBeforeSend> and <TypedChannel> elements.

Under the following conditions, XOML de-serialization will critically fail: the XOML code is not well formed, the XomlDocument is not the first element in the XOML code, and the first activity in the XOML code cannot be de-serialized. The developer will be presented with error message with which they may navigate to the offending XML element when switching from XOML view to process/workflow view.

Hosting the Orchestration Engine Designer

The designer framework may be hosted in any application program. This is a very useful feature for third party applications to render workflow in their respective environments. It also will allow third parties to develop tools around the orchestration engine designer by rehosting and customizing the design surface. The framework of the invention expects the hosting container application to provide a set of services such as editors and/or text buffers.

One step in rehosting the designer is to create a loader and a design surface. The loader is responsible for loading a XOML file and constructing the designer host infrastructure which maintains the activities. The design surface maintains the designer host infrastructure within it and provides services to host and interact with the design surface. The design surface acts as a service container as well as a service provider. In one example, the following code is executed to load a XOML document and construct a designer host which maintains the activities in it.

```
this.loader.XomlFile = filePath;
if (this.surface.IsLoaded == false)
    this.surface.BeginLoad(this.loader);
```

The following services enable different functions in the designer. An ISelectionService function maintains the selected objects. An IToolboxService function manages interaction with the toolbox. An IMenuCommandService function manages interaction with the menu. An ITypeProvider function enables the type system. In addition, there may be additional services provided by the designer hosting environment to enable advanced designer features.

The type system is a component in the component model framework of the invention. When a designer is hosted inside a project system, a TypeProvider object is created on a per project basis. Assembly references in the project are pushed to the type provider. Further, the user code files in the project are parsed and a single code compile unit is created and pushed to the type provider. Also, the invention listens to the events in the project system which may cause the types to be changed in the type system and makes appropriate calls to the type provider to re-load types in response to the changes.

Undo/Redo

After creating and correctly constructing a schedule, a developer may wish to rollback a series of performed operations. Undo and redo functions of the invention provide visual feedback illustrating which activity has been directly affected. For example, when a property change on an activity is undone, the activity which was affected becomes selected. When the deletion of multiple objects is undone, all the objects involved become selected when they are restored to the schedule. Undo/Redo is a common feature used throughout many applications in other fields and its meaning is well understood. In the orchestration engine designer, undo/redo items are not purged on Save. Further, undo/redo may be performed in the process/workflow view, XOML view, when a developer switches between views, and in the code beside.

Undo/Redo is provided for the following actions in the process/workflow view: activity drag and drop (e.g., dragging an activity from the toolbox to the design surface, moving an activity from one part of the schedule to another, and moving an activity from one designer to another), configuration of an activity (e.g., specifying properties for an activity), and cut/copy/paste/delete.

In one embodiment, the serialized view (e.g., XOML view) is an XML editor which provides the standard undo/redo operations of a text editor. The designer of the invention provides feedback to the developer indicating that changes made in the process/workflow view and then undone in serialized view will result in the loss of serialized code. When the developer constructs a portion of the schedule in the process/workflow view, switches to the serialized view and then decides to perform an undo/redo operation, a warning will appear.

Exemplary Operating Environment

Figure 12:
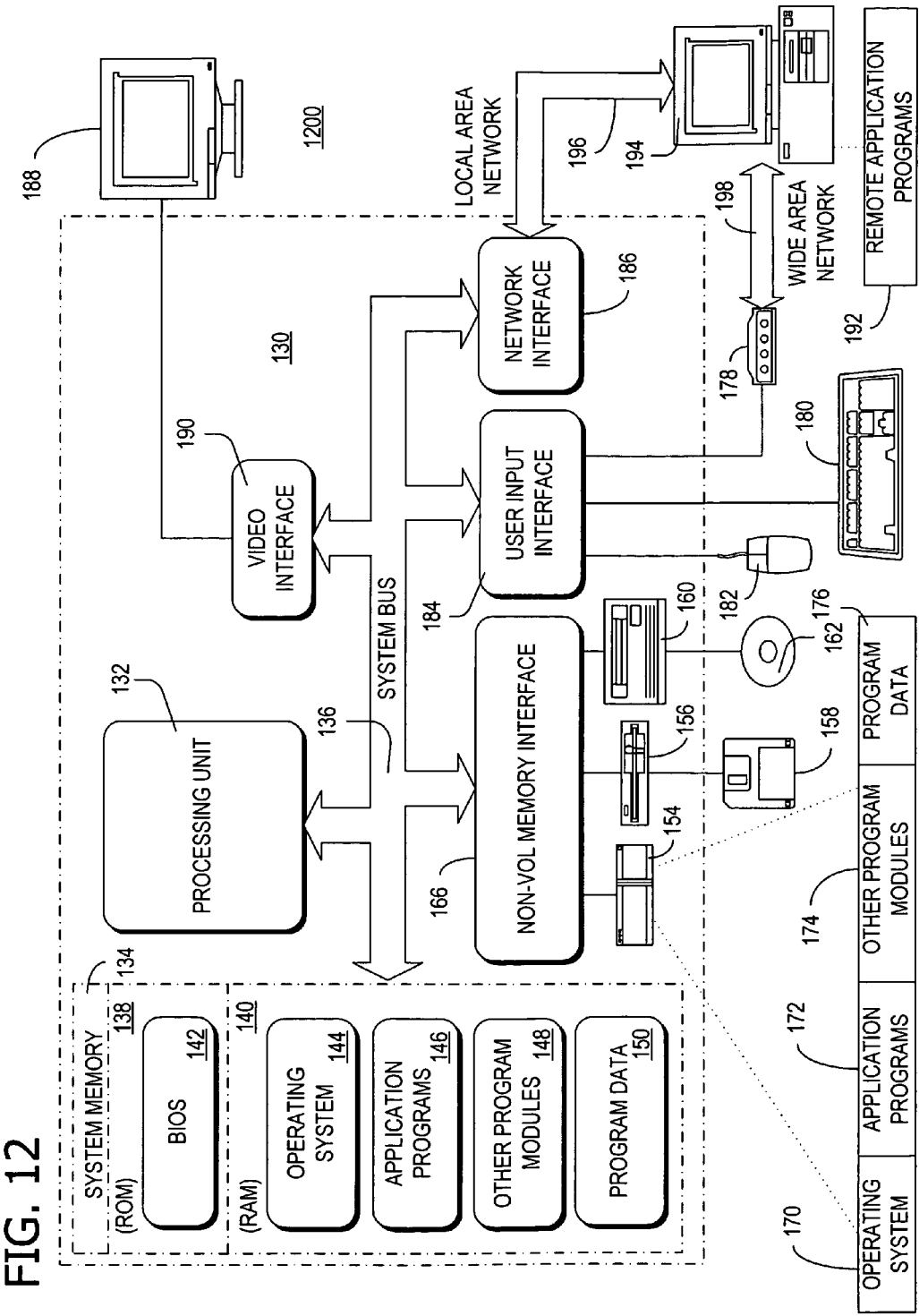
FIG. 12 is a block diagram illustrating one example of a suitable computing system environment in which the invention may be implemented.

FIG. 12 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 12 illustrates operating system 144, application programs 146, other program modules 148, and program data 150.

The computer 130 may also include other removable/non-removable, volatile/nonvolatile computer storage media. For example, FIG. 12 illustrates a hard disk drive 154 that reads from or writes to non-removable, nonvolatile magnetic media. FIG. 12 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 12, provide storage of computer readable instructions, data structures, program modules and other data for the computer 130. In FIG. 12, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 12 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 12 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

APPENDIX A

Exemplary Activities and Exemplary Implementation Thereof

Exemplary activities include the following: Send, SendRequest, SendResponse, Receive, ReceiveRequest, ReceiveResponse, Code, Delay, Fault, Suspend, Terminate, InvokeSchedule, InvokeSchedules, InvokeWebService, DotNetEventSource, DotNetEventSink, Sequence, Parallel, While, ConditionalBranch, Conditional, Constrained, ConstrainedActivityGroup (CAG), EventDriven, Listen, EventHandlers, ExceptionHandler, ExceptionHandlers, Compensate, CompensationHandler, Scope, and Schedule.

Each of the exemplary activities have metadata associated therewith. The metadata is transferred to a declarative representation of the workflow by the serializer associated with the activity. For example, the metadata may include an optional code-beside method and an optional collection of correlation sets.

Send Activities

The orchestration engine provides three activities (e.g., Send, SendRequest, and SendResponse) for sending messages, each of which addresses a different use case. Additionally, because the three activities share some metadata, an abstract base class is defined and used as the superclass of all three.

Receive Activities

The orchestration engine provides three activities (e.g., Receive, ReceiveRequest, and ReceiveResponse) for receiving messages, each of which addresses a different use case. Additionally, because the three activities share some metadata, an abstract base class is defined and used as the superclass of all three.

Code

The Code activity executes the code-beside method indicated in the metadata.

Delay

The Delay activity executes its mandatory code-beside method to generate a DateTime value. It internally sets the TimeoutValue property on its instance data to this value. If the DateTime is in the past, the Delay completes immediately. Otherwise, it sets up a timer subscription so that the Delay will be notified when the timer fires. When the timer fires, the Delay is notified and it completes.

Fault

The Fault activity executes its mandatory code-beside method to generate a Exception object. It then throws this exception.

Suspend

The Suspend activity suspends the current schedule instance.

Terminate

The Terminate activity terminates the current schedule instance.

Invoke Schedule

The InvokeSchedule activity invokes a schedule.

Invoke Web Service

Invokes a web service via a proxy class, passing and receiving parameters as specified.

DotNetEvent Sink

Blocks awaiting notification that the specified event has been raised by a previously invoked schedule instance.

DotNetEvent Source

Raises the specified event, and immediately completes execution.

Sequence

The Sequence activity coordinates the execution of a set of child activities in an ordered fashion, one at a time.

Parallel

The Parallel activity executes a set of child activities concurrently.

While

Iteratively executes the child activity.

ConditionalBranch

Executes the child activities, per Sequence semantics.

Conditional

A Conditional activity contains an ordered set of ConditionalBranch activities.

Constrained

When the Constrained activity is told by the CAG to execute, it simply executes the activity that it wraps.

CAG (Constrained Activity Group)

When the CAG executes, it executes (and re-executes) child activities based upon the evaluation of their enable and disable constraints.

Task

Model an external unit of work that is performed by one or more principals.

Event Driven

Wrap an activity whose execution is triggered by an "event" activity.

Listen

Conditionally execute one of n child EventDriven activities.

Event Handlers

The EventHandlers activity simply holds a set of Event-Driven activities, for use by the associated Scope.

Exception Handler

Wraps an activity with metadata that represents a catch block for a scope.

Exception Handlers

Wrap an ordered set of ExceptionHandler activities.

Compensate

Compensate a completed child scope.

Compensation Handler

Wrap a child activity that is defined as the compensation handler for a scope.

Scope

A scope is: a transaction boundary; an exception handling boundary; a compensation boundary; an event handling boundary; and, a boundary for message, variable, correlation set, and channel declarations (i.e. shared data state). Execution of the activities within a Scope is sequential, and thus the contained activities are explicitly ordered when the scope is constructed, as in a Sequence.

Schedule

A Schedule is the only top-level activity that the orchestration engine will execute.

Composite Activities

The composite activity types that enable control flow are: Sequence, Parallel, Constrained Activity Group, Conditional, While, Listen. Additionally, Scope and Schedule are composite activity types that act as containers with implied sequencing of the activities within them.

APPENDIX B

Visual Designer

A schedule is generally comprised of many activities. Each activity which has is own associated designer. The designers manifest themselves as icons in a graphical user interface (UI) (e.g., a visual studio) after the activity has been dragged from a toolbox onto the design surface of the graphical user interface. The designer provides a UI representation on an authoring object model (AOM). Developers are able to program directly against the object model and set properties on activities or use the designer and leverage visual studio's property browser.

Activity Creation and Configuration

Creating a schedule includes defining the activities and tasks which it is comprised of. The orchestration engine designer allows a developer to select an activity from the toolbox (e.g., under the category orchestration engine activities) and drag it onto the designer surface. If the activity has already been placed into a schedule and needs to be moved, the developer is able to select it (by clicking on it) and drag it to the area of the schedule where it needs to go. If a developer hold the control key while dragging and dropping, a copy of the selected activities selected are made.

An active placement feature provides the possible drop points (targets) as visual indicators based on the correct by construction semantic validation we perform. Activities may be dragged and dropped to any of these targets on the schedule. An auto scrolling feature also participates within the context of drag and drop. When dealing with large schedules, navigation to areas of the designer currently not in the visual studio view port are accessible by dragging the activity towards the area of the schedule to be placed. Drag and drop is supported across schedules in the same project and across schedules in other projects in the same solution. After an activity has been placed onto the design surface, the developer configures the activity via a set of properties. These properties are editable in the standard visual studio property browser. Each activity controls what properties are viewable in the property browser.

Guidelines for Dialogs

To aid the developer in configuring various activities, the designer provides a variety of dialogs or "sub-designers". Each of the dialogs are invoked for various properties of activities. A developer is able to invoke any designer for a property when it is annotated with an ellipsis in the property browser.

Type Browser Dialog

When configuring an activity through the property browser, a developer often will need to specify a type of a property or object. If the developer knows the type they require (e.g., System.String), the developer types it directly in the property browser. The type browser provides a visualization to all the compiled referenced assemblies in the project which match the expected type for the property. Reference projects must be first compiled before the assembly appears in the type browser. Based on the specific activity property being configured, the type browser filters the types displayed to the developer. Depending on the type expected by the underlying activity, the type browser filters on serializable classes and interfaces and classes that implement IComparable. For example, launching the browser from a message property on a send activity, the browser will list serializable classes. The orchestration engine recognizes message types, port types and correlation types as first class process types. The following table illustrates the mapping of these with the CLR types.

TABLE B1

| Exemplary Mapping to CLR Types. | |
| --- | --- |
| Message defined on a Send, Receive and their variants | OEMessage<T> Where T is any serializable CLR type |
| Channel Typed outbound defined on a send and its variants | OEOutboundChannel<T>; Where T is any interface |
| Channel Typed inbound defined on a receive and its variants | OEInboundChannel<T>; Where T is any interface |
| Correlation | OECorrelation<T>; Where T is any serializable CLR type that implements IComparable |

In one embodiment, the type browser graphical user interface is not resizable but provides horizontal and vertical scroll bars for each of the two sub-windows. The left sub-window default sort order is ascending based on the name of the type listed in referenced assemblies of the current project. Within the right sub-window, two columns exist: "Type Name" and "Fully Qualified Name". The default sort order is descending based on "Type Name". However, both of these columns may be sorted. The "Type Name" column may be resized to display the full type name. As a developer places focus on each assembly, the right sub-window displays the types permissible for selection (as described above) housed within that assembly. Upon selection of a valid type, the text box below the two sub-windows provides the name of the type, and which assembly it is housed within. The assembly information provides the assembly name, version number, culture and public key token. The text until this selection occurs reads "Please select a Type from the list." The developer ultimately decided to select a type or back out of the browser. The OK button is enabled when a type matching the activity's property has been selected. When a developer re-invokes the property browser dialog, the type and referenced assembly is automatically selected.

Another type of browser provided to aide the developer in configuring various properties for activities is the correlation set browser. In a running schedule, messages that are sent to a schedule are in fact intended for a specific schedule instance. For example, an invoice for purchase order #123 must be sent back to the same schedule instance that originated (sent out) that purchase order. To match an inbound message with the appropriate schedule instance, the message and the schedule instance share a key which is called a correlation set. Correlation sets are defined on Send and Receive activities. The Correlation Set Browser is used to help configure correlation sets. The first item to be defined is the name of the correlation set. If a developer is creating a new correlation set, they are able to directly input its name. If they are configuring a Send/Receive to participate within a predefined correlation, the drop down is populated with the names of the correlations. This list is retrieved from the code beside of the current project. The output of this dialog is a correlation variable in the code beside based on the configuration detailed here. For example, if a string typed correlation was created, the generated resulting code would be public OECorrelation<System.String>MyCorrelation=new OECorrelation<System.String>( );)

The next configuration option a developer needs to input is if the activity for which this correlation is participating is initializing the set. For the purposes of the designer, the option is a True or False. Another configuration detail specifies the type of the correlation set. In a similar fashion to configuring types for other activities, the type browser may be invoked. A developer is able to add and remove correlation sets for which the activity participates in. However, as a consequence of the correlation defined in the code beside, an activity may participate within correlations defined within previous activities. Also, removal of the correlation in fact removes the participation of the activity within the correlation, not the code generated by the code beside. If the developer wishes to remove the correlation from appearing, it is incumbent upon them to remove the definition from the code beside.

The tab order is: Correlation set, name, dropdown picker, Add, Remove, OK, Cancel and Help. If multiple correlation sets are defined, the tab will stop at the next defined correlation set before the Add and after the dropdown picker. The developer ultimately decides to create and/or remove a correlation or back out of the browser. The OK button is enabled when a correlation name and type has been provided. Clicking OK generates any code beside for new correlation sets and adds the activity to the defined correlations. Selecting cancel or hitting the escape key allows the developer to exist the browser without making changes to the activity. If an activity has not been configured correctly, the designer provides extensive feedback to the developer which and how each activity needs to be configured.

Constraint Designer Dialog

Irrespective of which constraint technology a schedule employs, the invention provides the ability for the developer to author constraints. It is an un-natural behavior for a developer to write code using a drag and drop metaphor. Therefore, the tool for constraint construction supports the ability to define the constraint both using the mouse and using a keyboard. Final generation of the constraint is persisted to XOML. Thus, the generated constraint is consistent with the existing XOML object model so it will allow developers to hand edit constraint definitions. The UI provided for constraint generation aids the user in creating the constraint and modifying it as well. This implies round tripping between a previously generated (and possibly modified) constraint and the UI.

User Model

Given an activity which allows constraint definition, the developer locates the corresponding constraint property and in the drop down indicates a desire to define a constraint by selecting the appropriate drop down. After definition of the handler, the property is annotated with an ellipsis in the property browser to invoke the constraint editor. A developer is able to specify the name of the constraint. This name is persisted to XOML with the rest of the constraint definition. Constraint definition occurs using four columns within a definition grid: operand, operator, value, and group by. The operand is a drop down that contains the operands that will participate in the constraint. Developers are able to type directly into the drop down and use auto-complete to quickly select the desired operand. The operator is a drop down that defines the operator to be used within the constraint. Developers may type the operator directly into the drop down which will quickly select the desired operator. The value is the developer-defined value to be used within the constraint. Upon saving the constraint, this value is compared with the selected property to ensure that the types match. If the types do not match, a message appears such as "the operand and value types do not match" and the developer is directed to the offending predicate. The group by column is a drop down with two acceptable values including "AND" or "OR". As the constraint definition is proceeding, a developer is able to view the constraint in a non-editable dialog below the definition grid. This allows a developer to view the constraint in a more straight forward manner. The output would resemble the following: ((A<3) AND (B>C)) AND (D=3)) OR (F=5).

Activity Error Handling: "Smart Tags"

The invention provides a few sub-designers which help configure specific activities such as type browser, correlation set browser, and rules designer. When an activitiy is insufficiently configured, an activity's designer is adorned with an icon resembling an exclamation point smart tags. A developer clicks on the icon to see a dropdown list of the configuration errors specific to that activity. For errors related to property configuration, the selection moves the focus to the property browser and places the focus on the property in error. The icon disappears when all the activity's properties are valid.

Design Surface Features

The designer of the invention also provides some other UI options that help in matters of accessibility. Many of these features within the context of the process view are provided to assist the developer manipulate large schedules. For example, zoom allows a developer to expand a selection of their schedule. There are several mechanisms for zooming in/out of a schedule, each designed for a specific function. In one method, a developer may zoom into a schedule by setting a specific zoom percentage. Exemplary percentages are 40%, 60%, 80%, 100%, 150%, 200%, 300%, and 400%. These levels may be set by using the top level workflow menu or by using command buttons on the scroll bars. Workflow view allows the user to set the zoom level. Zoom level addresses the scalability issue for huge workflows. The zoom level may be set by using the top level workflow menu or by using command buttons on the scroll bars. Zoom level does not affect the editing of the workflow; multiple coordinate systems enable the workflow view to achieve this. Workflow view caches the zoom factor and then uses it for rendering and coordinate transformations. Zoom factor is used in drawing by selecting it in the Graphics.ScaleTransform method. When this is done all the drawing done using the graphics object is transformed based on the scaling used. All the coordinates are multiplied by the scale factor before drawing. The zoom factor is also used when user does any actions with the mouse for coordinate transformations.

In another method, a developer may zoom into/out of a schedule by selecting Zoom In/Zoom Out options as options from the vertical scroll bars. This changes 'modes' of the designer which is indicated by the cursor switching to a magnifying glass. A developer may then "rubber band" the area of schedule where they wish to zoom in/out of. If Zoom In is selected, clicking the mouse button "zooms" the designer in (and vice versa for Zoom Out). However, a developer may hold the shift key down and toggle between Zoom In/Out when in each respective mode. Finally, to escape either mode, the developer may hit the "Escape" key and will be back in "default" mode. When in "default" mode, a developer may hold the "Control" key and scroll with the mouse wheel to Zoom, The zoom level does not inhibit the ability for a developer to manipulate a schedule. Stated another way, developers may manipulate, add/remove activities irrespective of the zoom level. The default zoom level is 100%. The zoom setting state is preserved irrespective of the view. More specifically, if the developer switches to XOML view, print preview, or code beside, or closes the schedule or the solution, the zoom state is preserved.

Pan provides the developer the ability to "grab" and shift a schedule. The developer selects Pan mode and the cursor is changed to a hand icon. When the developer clicks the mouse, the hand icon "grabs" the surface, and mouse movement shifts the surface in the direction of the mouse. Pan is accessible as an option from the vertical scroll bars. When in pan mode, the developer is not able to add/remove activities from the designer. Pan specifically focuses on shifting the current view of the schedule within the designer.

For large schedules, a developer might not leverage the zoom feature of the designer and thus have a part of the schedule which is not visible. The developer still needs the ability to be able to drag new activity from the toolbox and add it to the schedule. In this scenario, the developer may drag an activity onto the area of the schedule where they want to scroll and upon entering the "auto scroll zone" arrows will appear and the schedule will shift in the direction the activity is being dragged. These arrows activate and scroll the designer view when the activity enters a region 10% of the viewable area of the screen in the direction the developer wishes to navigate.

In particular, the invention provides a mechanism for the user to navigate to a part of workflow; focusing and modifying that part and moving on to edit some other part of workflow. Auto panning enables the user to get the overall picture of the workflow drawn and magnifier enables the user to zoom onto a specific part of the workflow. Auto panning feature is integrated with zooming and auto scrolling so that user may tackle workflows which are really large. To start the auto panning process the user clicks onto the magnifier icon which is displayed on the vertical scroll bar. On clicking on this icon; the workflow view enters auto panning mode. In this mode current workflow snapshot displayable in viewport is taken by calling TakeMagnifierSnapShot. This function takes a snap shot of the workflow in memory bitmap without the zoom factor. After doing this the zoom factor of the workflow is calculated so that most of the workflow is visible in the viewport. Mouse is then transformed to Magnifier cursor. The hotspot of the cursor is mapped to the part of memory bitmap of the workflow. The mapped part of the memory bitmap is then displayed in magnifier. For a very large workflow if the user enters the auto scroll area then auto scrolling takes place which modified the viewport displayed. Once the auto scrolling stops; a new viewport bitmap is captured. When the user releases the mouse the hotspot of the cursor is mapped to the actual workflow part and that part is centered on the screen. Following is the pseudo code for Auto Panning

```
-If user enter the autopanning mode
    -Set the zoom level so as to display as much as workflow as possible
    -Capture the visible workflow bitmap
    -if user is dragging the mouse
        -get the mouse coordinate
        -map it workflow bitmap
        -draw the magnifier by copying the mapped workflow bitmap
        -if mouse enters autoscroll area and workflow may be scrolled
            autoscroll
        -else if user leaves the autoscroll area
            -recapture the visible workflow bitmap
        -endif
    -else
        -get the coordinate of the mouse release
        -map it to the workflow area
        -center the workflow area
-endif
```

In one embodiment, the invention supports the auto panning by displaying a small pan window on the right bottom of the workflow; where the user is able to see the representation of the entire workflow in thumbnail form.

While still within the theme of navigating large schedules, a document outline feature lets a developer quickly view the schedule at a glance and by selecting a node in the outline, navigate the designer to the selected activity. The children for each node are ordered based on their placement in the sequence. Double clicking on a node or a leaf will navigate a developer to the selected activity in the schedule. Schedules which have been inlined are presented as single nodes in the document outline. The activities which comprise the inlined schedule will not appear as separate entries in the document outline. At any point a developer is able to perform all the schedule operations defined throughout the functional specification (add, delete, copy, paste, rename etc) and the document outline is reflected accordingly. Multiple selections of activities within the document outline correspondingly select the activities within the process/workflow view. Holding the control key and selecting nodes within the document outline highlights the selected nodes to indicate that they have been selected. If a scope has an event and/or exception handler defined, it is displayed at the same level as the scope. This allows the developer to view the scope in its entirety in one place versus having to flip through the various pages of the scope designer.

Active placement uses the ability to evaluate the correct by construction semantics to provide a positive indication of which activities may be placed throughout the schedule. As a developer drags an activity from the toolbox onto the designer, targets appear on the schedule. As the developer drags the node near a target location, the target should be activated. Activation is apparent when the icon for the dragged activity snaps and replaces the original target. When this happens, the developer may release the mouse button and the node snaps to the schedule at the location indicated by the active target. In the multiple section drag-drop scenarios, the targets displayed should be those which satisfy all semantic validations.

The concept of composition refers to the recursive inclusion in a schedule or task of other schedules and tasks. The workflow designer makes it easy for a developer to develop schedules and tasks and then invoke these within other schedules and tasks. However, whenever a developer creates either a new schedule or a new task, the visual studio makes the compiled version the workflow or task available to other orchestration engine projects (of all types) via the toolbox. To invoke that compiled workflow or task, the developer drags it from the toolbox onto the schedule, just like any other activity. Schedule in-lining provides a view into this new schedule or task directly in the new encompassing schedule. This is a read only insight that provides a view the inner workings of the encompassed schedule or task.

Composite activities within the schedule or task may themselves be expanded or collapsed. State of each expansion or collapse is maintained. So, if an outer construct (such as a parallel or a scope) is collapsed but and inner construct was expanded, expansion of the outer will still provide the expanded inner. Given that this is a read only view, a developer is able to copy/paste and drag-drop activities held within the inlined schedule to the encompassing schedule. By default, when a developer is creates a schedule, it participates in schedule inlining. However, there are scenarios where a "callee" schedule writer does not want the "caller" schedule to view the inner workings of their schedule. During authoring of the callee schedule, a developer is able to indicate that his schedule will may not be inlined. When the "caller" developer tries to inline this attributed schedule, the message "The Author of this schedule does not allow schedule inlining" appears.

Themes

The orchestration engine designer may be hosted in different applications providing the host environments. When hosted inside other applications the orchestration engine designer look and feel is morphed so that it may blend into the hosting application. The user is able to change the visual parameters of the designer when hosted inside the visual studio development environment as per the user's need. The theme support allows the user to change the visual parameters of the orchestration engine designer without affecting the designer implementation or modifying the designer code.

The theme support has two parts to it; first is at development time and the other at usage time. At the development time when designer writers write the designers for activities which take part in workflow. While developing the designer; designer writer writes a designer in such a way that it will be able to participate in the theme support. This is done by developer abstracting configurable visualization information inside the designer out to a designer theme class which is then associated with designer using a theme attribute. The developer then uses the information from the designer theme class while rendering the designer visualization.

When user is using the designer he/she may morph the designers by writing a theme file. The theme file is a collection of designer themes which individually describe the visualization parameters which each designer expects. The theme file may be created by the user by hand editing the XML file or through the default UI.

Themes allow a developer to customize the appearance of the workflow activities. Each activity has a corresponding designer which exposes a specific set of properties which may be "themed". Providing a theme further supports the possibility for customization and re-use of the workflow designer by providing extensibility for visualization customization. Within the visual studio, developers are able to configure which theme is currently applied to project by navigating to the Tools menu, selecting Options, choosing Workflow Designer and selecting themes.

A developer is able to create a new theme or specify the theme they wish to use by using the "Theme" drop down. New themes may be created when a developer selects "Create a New Theme" and specifies the name of the theme file. Selecting the "Browse" button invokes the File Dialog to search for theme XML files. The Designer drop down allows a developer to select groupings (Primitive and Composite) of activities, or the specific activities themselves to be themed.

Themes may be applied at their core groupings: Primitive (which internally derive from ActivityDesigner) and Composite (which internally derive from ICompositeActivityDesigner). Designers which inherit from each of these classes inherit their theme. However, designers for specific activities may be each individually themed. If this occurs, the explicit activity designer theming takes precedence over its inherited behavior. As an example, if the ActivityDesigner theme has a text font color of blue, then all the designers use this font color. However, if the theme specifically called out the code shape to use red as a font color, then all the activities display blue text font color, except for the code shape which displays red.

A theme may customize the process view and the each of the activities which comprise the schedule. Most of the activity designers derive from two classes: ActivityDesigner and ICompositeActivityDesigner (which derives from ActivityDesigner). These are the elements which are themed and their corresponding pickers. For the process view, the elements to be themed are Theme Style (Large/Medium/Small), Show Smart Tag (Yes/No), Show Scroll Indicators (Yes/No), Show Drop Indicators (Yes/No), Show Shadow (Yes/No), Watermark (Yes/No), Foreground Color (Color Picker), Background Color (Color Picker), Show Grid (Yes/No), Draw Monochrome (Yes/No), Show Grid (Yes/No), Selection (e.g., Foreground Color and Pattern Color), Font Family (Font Picker), Font Style (Font Picker), Draw Rounded (Yes/No), Content Alignment (Near/Far/Center), Show Content (Text, Icon, Both), Show Border (Yes/No), and Connector (e.g., StartCap and EndCap).

For the individual activity designer, the following are capable of being themed: Foreground Color (Color Picker), Background Color (Color Picker), and Border (e.g., color and style). For the individual composite designers, the following are capable of being themed: Drop Shadow (Yes/No) and Watermark (Yes/No).

Print Preview

In a similar manner to other applications, the orchestration engine designer provides a Print Preview feature. This feature alters the visual layout of the process/workflow view to reflect how the schedule would be printed given the currently selected printer. Conceptually, Print Preview is another view on the existing process/workflow view. Thus, a developer is still able to perform all schedule, activity and task manipulation they are accustomed to. With Print Preview, the developer is able to understand in real time the printing implications when schedule manipulation occurs. The process/workflow view, in its entirety (including SmartTags) is printed. Developers may invoke print preview from the File Menu by choosing "Print Preview" or clicking on the topmost icon in the vertical scrollbar. When invoked, the default view should be at 40% of the original.

A developer may dictate various page layouts and specify the customary document features like margins, header/footer options and may scale the workflow and align it as necessary. There are two tabs within the non-resizable Page Setup dialog. The first tab details page specific date. The values for Paper Size, Paper Source and Orientation are retrieved from the default printer. By default, margins are one inch from every edge. Finally, the default values for scaling are adjusted to 100% of the normal size. There is no default for centering on a page. The second tab of the Page Setup dialog addresses Header and Footer options. The default values for margins are 0.5 inches and central alignment. As with many other applications which provide header and footers for printed pages, the text may be templated. The default template options include the following:

```
-Page {#}
  -Output: Page 1
-Page {#} of {##}
  -Output: Page 1 of 10
-{FullFileName}, Page {#} of {##}
  -Output: C:\Test Plan\OE Designer Test Plan.doc, Page 1 of 10
-{FullFileName}, Page {#}
  -Output: C:\Test Plan\OE Designer Test Plan.doc, Page 1
-{FileName}, {Date} {Time}, Page {#}
  -Output: orchestration engine designer Test Plan.doc, 04/07/04 1:12, Page 1
-{FileName}, Page {#} of {##}
  -Output: orchestration engine designer Test Plan.doc, Page 1 of 10
-{FileName}, Page {#}
  -Output: orchestration engine designer Test Plan.doc, Page 1
-Prepared by {User} {Date}
  -Prepared by JoeUser 04/07/04
-{User}, Page {#}, {Date}
  -JoeUser, Page 1, 04/07/04
-{custom}
  -User defined
```

These template options are available for both the header and the footer. However, a developer is able to specify their own text in the "Custom" text boxes.

Accessibility & Keyboard Navigation

The orchestration engine designer provides the ability to navigate through a constructed scheduled schedule at an activity by activity level. The following keyboard navigation is supported:

A developer may traverse a schedule using the up, down, left and right arrow keys.

Composite activities may be expanded by using the "+" key and collapsed using the "−".

A developer is able to cancel a drag-drop operation while it occurs by hitting the e-escape key.

Hitting the Enter key has the same effect as doubling clicking on the activity.

UI Persistence

The designer provides the ability to save UI configurations for the following items: zoom, print preview state, scroll bar position, selection, and activity designer specifics including expanded or collapsed state for composite activities, workflow versus exceptions versus events state for scope and schedule, constraint activity group (CAG) edit or preview mode, currently active activity in preview activities (e.g., for CAG, events, and exceptions), and inlining state XOML View When creating a schedule, a developer is fundamentally working with two separate items: an editable graphical representation of the workflow (which you may also manipulate as XML whenever that is desired) and code-beside (e.g., C# or Visual Basic). This definition may be manipulated as XML or XOML. XOML is the XML representation of the schedule. The process/workflow designer's purpose is to aide the developer to quickly generate this XML.

Developers may toggle between the rich graphical process/workflow view and a schema-based XML view (the XOML view). To do this, a developer may use the small buttons located at the bottom left corner of the workflow design window or switch between views by using the hot keys F7 (for XOML) and Shift-F7 (for process/workflow view). The XOML editor provides IntelliSense, colorization, method tips and statement completion. A developer may invoke Intellisense by pressing Control and pressing the spacebar simultaneously. In a similar manner to the standard C#/VB editors, Xoml view provides the ability to outline Xoml definition. This is available by right clicking and choosing the "Outling" context menu.

Theme Attribute

To associate a theme with an activity designer; an activity designer needs to be decorated with ThemeAttribute. This way the designer writer may associate theme related meta data with the designer. The theme infrastructure picks up this meta data when the designer is created and may pass it to the designer as and when needed to render the designer visualization. Following is the example of how we associate a theme attribute with the send designer.

The Theme attribute class takes two parameters; type of the theme object associated with the designer and the initializer XML from which the theme object will be initialized. The initializer XML is an optional parameter.

TABLE B2

Theme Attribute Class Members.

| Member Name | Description |
| --- | --- |
| DesignerThemeType | DesignerThemeType specifies type of designer theme class which is associated with the activity designer. This theme class holds the data which the designer requires to morph itself when participating in theme support. Activity designer writers may have their own theme classes in which the information specific to the rendering of their designer is stored. |
| Xml | The XML attribute is used to specify the XML with which the DesignerThemeType specified by the designer writer will be |

TABLE B2-continued

Theme Attribute Class Members.

| Member Name | Description |
|---|---|
| | initialized. The xml attribute may have different types of values, it may be either<br>a. An XML manifest resource embedded into the assembly in which the DesignerThemeType resides.<br>b. It may be a file which resides in the same directory as the parent theme of which the designer theme is a part<br>c. It may be a XML string which may be loaded and deserialized. |

In addition to associating the designer theme with the designer the designer writer abstracts the visualization data out of the designer. The designer writer creates a DesignerTheme derived class and puts the abstracted data in the class. The designer writer may then query the derived designer theme class for parameters used in operations such as rendering, layouting etc. The DesignerTheme class is the base class from which all the designer themes need to be derived. This class contains the base information used by all the designers to participate in theme support. The base data members in the DesignerTheme class are as follows,

TABLE B3

Base Data Members in the DesignerTheme Class.

| Member | Description |
|---|---|
| DesignerType | Type of the designer associated with DesignerTheme. This information is used to resolve the resource namespace and associate a theme with Designer type. |
| ApplyTo | Fully qualified name of the designer with which the theme is associated. |

The above members provide association of the individual designers with themes. There are cases in which each designer needs to have additional information for rendering itself. This is done by deriving designer specific theme classes from DesignerTheme class and putting the specific information in that class.

ActivityDesignerTheme class is used to describe the theme for simple designers like Send, Receive, Delay etc. The simple designers do not have hierarchy of other designers under them and may render themselves based on the information in the ActivityDesignerTheme class. Each designer has its own initializer XML with which it initializes ActivityDesignerTheme class in order to render itself. Following is the list of designers which use ActivityDesignerTheme class to describe their abstracted visualization information: ActivityDesigner, CodeDesigner, CompensateDesigner, DelayDesigner, FaultDesigner, InvokeWebServiceDesigner, ReceiveDesigner, ReceiveRequestDesigner, ReceiveResponseDesigner, SendDesigner, SendRequestDesigner, SendResponseDesigner, SuspendDesigner, and TerminateDesigner.

Following are members of activity designer class

TABLE B4

Members of Activity Designer Class.

| Member Name | Description |
|---|---|
| Geometry | Geometry of the designer which the theme supports. Supported Geometries are Rectangle, RoundedRectangle, Ellipse, Diamond. The geometry is obtained from the ambient theme by the designer. |
| Size | Size of the designer, this is defined based on the designer style member of ambient theme, |
| Foreground | Forground color, width and style of the designer. The foreground information contains information about type of Pen which will be used to render the designer foreground. |
| Border | Border color, width and style of the designer. The border information is used to create the pen to draw the border for the designer. |
| Background | Background colors, gradient etc. This information is Brush related information which will be used to draw the background of the designer. |
| ImageSize | Holds the information about Image size associated with the designer. |
| Font | Holds the information about rendering the text on the designer. |
| PenWidth | Pen width used to render the designer. This is defined by the ambient theme member designer style. |
| Pens and Brushes | All the themes contain accessors for pens and brushes associated with the colors. Theme buffer these pens and brushes and destroy them when the theme is disposed. |

CompositeDesignerTheme class is used to abstract visualization information of composite designers such as Parallel or Sequence. This class holds the information related to rendering of Connectors and header/footer in the composite designers. In addition to the members of the ActivityDesignerTheme class the CompositeDesignerTheme class contains following properties:

TABLE B5

Properties of the Composite Designer Theme Class.

| Member | Description |
|---|---|
| ShowDropShadow | Boolean property indicating if a Drop shadow is to be drawn around the composite designer. |
| ConnectorStartCap ConnectorEndCap | Information about style of the connector used in CompositeDesigners. |
| ShowWatermark | Boolean flag indicating if the watermark needs to be shown. |
| Watermark | Source of the Image to be drawn as Watermark in the CompositeActivityDesigners. This property is of type string and may be relative file path or resource namespace. |
| Vertical and Horizontal connector sizes | Size of the connectors used for Composite Designer. |

TABLE B5-continued

Properties of the Composite Designer Theme Class.

| Member | Description |
| --- | --- |
| ExpandButtonSize | Size of the expand button of the Composite Designer. |
| Pens and Brushes | Pens and Brushes used to render the theme. |

Following is the list of designers which have CompositeDesignerTheme associated with them: CompositeActivityDesigner, CompensationHandlerDesigner, ConditionalDesigner, ConditionedDesigner, EventDrivenDesigner, EventHandlerDesigner, ExceptionHandlerDesigner, CompositeScheduleDesigner, ListenDesigner, ParallelDesigner, ScopeDesigner, SequenceDesigner, GenericTaskDesigner, WhileDesigner A PreviewDesignerTheme is associated with the designer such as CAG, ExceptionHandlersDesigner etc. which display collection of child designer in them in the form of a item strip. The class contains data used to render the item strip as well as the preview window in which the items are shown. In addition to the members of the CompositeDesignerTheme class the PreviewDesignerTheme class contains following properties:

TABLE B6

Properties of the PreviewDesignerTheme class.

| Member | Description |
| --- | --- |
| ItemSize | Size of the item displayed in preview strip. This is defined based on the designer style property of ambient theme. |
| ItemCount | No of items to be displayed in preview strip. This is defined based on the designer style property of ambient theme. |
| PreviewWindowSize | Size of the preview window. This is decided based on designer style enum. |
| PreviewButtonSize | Size of the preview button. This is decided based on designer style enum. |
| BackColor | Back color of preview strip and preview window. |
| Pens and Brushes | Pens and brushes used to draw the preview designer theme. |

Following is the list of designers which have PreviewDesignerTheme associated with them: ActivityPreviewDesigner, CAGDesigner, EventHandlersDesigner, and ExceptionHandlersDesigner The AmbientTheme class is associated with the WorkflowView and contains information not only about rendering the WorkflowView. The information contained in this class is related to global visualization options which apply to all the designers such as selection, smartag, expand button etc. In addition to this; the information about drawing things such as grid, workflow background, watermark etc is also contained in this class.

In addition to the members of the DesignerTheme class; the ServiceRootDesignerTheme contains following properties.

TABLE B7

Properties of ServiceRootDesignerTheme.

| Member | Description |
| --- | --- |
| ShowSmartTags | Show smart tags on design surface. |
| ShowScrollIndicators | Show auto scroll indicators when the scrolling is possible. |
| ShowDropIndicators | Show auto snapin drop indicators. |
| WorkflowShadow | Draw workflow 3D. |
| WorkflowGrayscale | Draw workflow black and white. |
| DropHiliteColor | Drop hilite color. |
| Selection Colors | Selection foreground and pattern colors. |
| Workflow Colors | Workflow foreground, background and workspace colors. |
| Workflow Watermark | Watermark to show on the workflow. |
| Font | Font to be used to render text. |
| TextQuality | Text quality AniAlias vs normal. |
| DesignerStyle | Designer style, Small/Medium/Large. This property defines pen thickness and different sizes for elements rendered. |
| DrawRounded | Draw rounded edges for designer borders. |
| ContentAlignment | Text, Image content alignment in designer. |
| Contents | Text, Image content to render in the designer. |
| ShowDesignerBorder | Show/Hide the designer border. |
| Margin | Margin size, this is based on designer style. |
| SelectionSize | Selection size based on designer style. |
| SmartTagSize | SmartTagSize based on designer style. |
| ScrollIndicatorSize | Scroll indicator size based on designer style. |
| DropIndicatorSize | Drop indicator size based on designer style. |
| Pens brushes and images | All the pens, brushes and images used to render the workflow. |

Once the theme is associated with a designer; the designer uses it when it is performing layout, rendering or any other activity where the theme parameters are needed. A GetDesignerTheme method takes a designer type as parameter. When called, this method results in the Theme class returning the DesignerTheme derived theme class associated with the designer. The designer may then access various parameters in the DesignerTheme derived class as well as may get resources associated with the DesignerTheme class to render the designer. The theme class is responsible to manage the current designer theme, resources associated with the theme and also firing events when user changes the theme.

The Theme class contains infrastructure to manage DesignerThemes. Following are the functions of Theme class.

Serialize/Deserialize DesignerThemes.

Report errors during serialization process.

Fire events when theme changes.

Manage DesignerTheme classes associated with different designers.

Manage theme resources and act as cache for objects created for drawing.

Perform resource resolution requested by the contained DesignerThemes.

The theme class exposes following properties to enable the theme support in the designer,

TABLE B8

Properties of the Theme Class.

| Member | Description |
|---|---|
| *Static Properties* | |
| CurrentTheme | Returns the current theme object used to render the designer. The current theme object manages the DesignerTheme and resources associated with it. |
| EnableThemeEvent | Boolean property which suspends firing of ThemeChange event. This is required when the user wants to apply temporary theme and see how it affects the designer rendering. |
| LoadTheme(FileName) | Loads the theme from theme file and sets the current theme. |
| SaveTheme(FileName) | Saves current theme to a file. |
| ThemeChanged event | ThemeChanged event is fired when current theme is changed. |
| *Instance Properties* | |
| Name | Name with which the current theme is identified. |
| Version | Version associated with the theme. |
| Description | Detailed description of the theme. |
| ContainingDirectory | Directory in which the theme resides. |
| DesignerThemes | Collection of designer themes used for persistence. |
| AmbientTheme | AmbientTheme associated with workflowview. |
| GetDesignerTheme(Type) | Given a designer type returns the DesignerTheme associated. |

The theme class maintains all the designer themes used to render the activity designers to allow maintenance of resources and the theme information globally. All these resources are shared across different instances of designers with same process. This prevents draining of resource pool as well as increases performance as designers do not have to recreate the objects.

The theme class also exposes a static ThemeChanged event. All the workflow views listen to this event. When user changes current theme, the theme class fires ThemeChanged event which all the workflow views listen to. The workflow views then relay out themselves and the designers they contain by calling IActivityDesigner.OnThemeChanged method. Each designer may override this method and may perform custom action in response to the theme change event.

Users may morph the appearance of the design surface by writing specific themes which describes the parameters which each individual designer should adhere to in order to render itself. The user does this by writing theme files. The theme file is an XML file which contains individual designer theme sections which describe the theme parameter for each designer. The user may create the theme file manually or he/she may use the default UI.

TABLE B9

Constructs of the Theme File Format.

| Construct Name | Description |
|---|---|
| *Theme Element: Used to define theme which will be applied to design surface* | |
| Name | Theme name which will be displayed to the user in theme configuration dialog described below. This is the name with which the theme is identified. |
| Description | Detailed description which describes the theme. |
| Namespace | Assembly qualified namespace in which the Theme class exists. System.Workflow.ComponentModel.Design namespace is the one in which the theme class exists. This is the default namespace for the theme file. |
| DesignerThemes Element: | Used to define collection of individual designer themes |
| Theme ObjName Element: | Designer theme derived class containing abstracted information about the designer visualization data. |
| ApplyTo | Fully qualified name of the designer to which the theme will be applied to. |
| Namespace | Assembly qualified namespace of the designer theme class. If the theme object is not in the default namespace then developer needs to specify the namespace in which the designer theme class exists. |
| Simple properties | Properties associated with the DesignerTheme class which are of primitive data type. (e.g., Geometry, Rendering Hint) |
| Composite Properties | Compound properties associated with DesignerTheme class (e.g., Size, Text) |

Hand editing the XML file is one way to create the theme. The other way to create the theme is to use the UI provided. When using the designer inside the visual studio the UI for customizing theme is shown under Tools->Options->Workflow Designer->Themes. The themes UI is re-hostable. If the orchestration engine designer is hosted outside visual studio, users may write their own dialog to host the themes UI. To rehost the themes UI outside the visual studio, the user may use a ThemePage class.

The themes UI allows multiple ways to create themes. The user may select existing themes or may select existing themes and modify them to create new theme. Once the user modifies the theme he/she may save the theme as a different theme file by selecting the save button. The themes UI operates in two different modes: property configuration and designer preview. The user may flip between this by using a preview mode button.

In property configuration mode; the user may select individual designer. When the designer is selected from the drop down, the properties associated with the designer are shown in the property browser. The user may flip these properties to modify the appearance of the designer. The effect of modifying the individual properties may be viewed by flipping to the designer preview mode. In the designer preview mode; the design surface is hosted in the dialog. A temporary activity tree is created in memory to show the effect of the theme changes on individual designers.

Auto Scroll

An auto scroll feature enables users to navigate quickly to any part of the workflow while performing drag drop operation or doing auto panning. The auto scroll feature is enhanced by adding auto scroll indicators. The auto scroll indicators are visual clues which enable the user to understand possible direction in which the Auto scroll may happen. The auto scroll indicator feature improves the designer usability.

WorkflowView supports a property called ShowAutoScrollIndicators which returns a Boolean value to indicate when the auto scroll indicators need to be displayed. The WorkflowView contains bitmaps to indicate the direction in which the scrolling is possible. In case of auto panning or drag drop events the WorkflowView requests painting of its client area. In response to the painting request it draws the Auto scroll indicators in semi transparent fashion by overriding the drawing logic.

User may often have a workflow which does not fit in the viewport (part of the workflow view visible to the user at any point of time) In such cases the workflow view has associated horizontal and vertical scrollbars. It is a common scenario when the user tries to drag new object from the toolbox and wants to drop on part of workflow which is not visible or wants to reorder the activities within the workflow. This is possible without scrolling for a small workflow but for larger workflow we need to scroll the designer when the user wants to drop an object outside the viewport. Auto scrolling feature implemented in the workflow view makes it possible to scroll the workflow when the user drags the mouse and hovers on the auto scroll zone. Following is the pseudo code which illustrates how this is done.

```
-for every drag drop message
    -If the message is drag hover then
        -If the workflowview does not fit in the viewport
            -calculate the autoscroll zone which by taking 10% of workflow
             area along the edges
            -if the coord in the mouse action falls in the autoscroll zone and
             workflow view
scroll
                -trigger the autoscroll timer
                -incr or decr scroll position in timer based on mouse position
                 in autoscroll zone
            -else
                -stop the autoscroll timer
```

Drag and Drop Connector Adornments

This feature improves usability of the drag and drop operation. When user starts dragging a component designer automatically distinguishes those connectors that allow drop of the dragged components. Once the cursor gets close enough to the connector, the dragged image snaps in to the connector. Workflow view contains adornment service to add adornments on the activities. Adornment service enables activities to draw commonly used UI glyphs after the drawing of all activities are done. This guarantees that none of the glyphs are drawn over by other activities thus giving the glyphs a special treatment. Currently the activities support various types of glyphs these include Insufficient configuration, selection, selectable connector, breakpoint etc. Adornment service class may be viewed as a private helper class of the workflowView. Adornment service is responsible to represent a glyph differently when the glyph becomes active. The glyph may become active based on mouse actions which are performed by the user on the glyphs, these include mouse hover or mouse click. An active glyph may take different actions based on if it is active; these include showing a drop down menu or triggering navigation to property browser, triggering validation routine to show smart tag action glyphs on the activities etc. In addition to adding glyph on the activity; the adornment service also adds glyphs on the property browser by using IPropertyValueUIService. The adornment service is responsible to add the designer actions associated with glyphs to the task list of Visual Studio IDE.

Upon creation the adornment service starts listening to different events based on which the activity designers may feel a need to represent a glyph. These events include:

IComponentChangeService
  ComponentChanged: Triggered when component property changes.
  ComponentAdded: Triggered when new component is added.
  ComponentRemoved: Triggered when component is removed.
ISelectionService
  SelectionChanged: Fired when Selection in designer changes.
IPropertyValueUIService
  AddPropertyValueUIHandler: Fired on selection change or property refresh in property browser.
ITypeProvider
  TypesChanged: Fired when new types are added/removed from typesystem.

Whenever one of the above events is triggered the adornment service waits for the next idle message. In the idle message the adornment service requests the activity designer to update Designer actions associated with Glyphs and invalidates the viewable designers. The designer action request triggers the background validation. After getting the updated designer actions; the adornment service puts the actions associated with the selected designer in the task list and also notifies the property browser about the changes by calling NotifyPropertyValueUIItemsChanged function on IPropertyValueUIService which in turn shows a property needs config. Icon on the property in property browser. When this icon is clicked designer actions associated with the property is triggered. The adornment service then goes thru all the designers gets their glyphs and draw the glyphs on top of the designers. If mouse hover or click takes place on top of any of the glyph; the adornment service activates the glyph and shows designer actions.

All glyphs returned by the activity designers are derived from an abstract class called DesignerGlyph. This class defined a behavior related to each of the glyph. Following is the class definition for the DesignerGlyph class. The table below explains each of the method in DesignerGlyph class and its use.

TABLE B10

Glyph Methods.
Methods

| | |
|---|---|
| GetActivatedBounds | Returns the glyph bounds when the glyph is activated. |
| DrawActivated | Draws a glyph in activated state. |
| Clicked | Indicates to the glyph that user has performed action on the glyph. |
| GetBounds | Returns the bounds of the glyph. |
| Draw | Draws the glyph in normal state. |

Glyphs may or may not have DesignerActions associated with them. Designer actions are set of user actions which are needed to be performed when user activates a glyph. DesignerAction class is used to indicate the user actions. The DesignerAction class is derived from a class called DesignerVerb which is used to display menu items. DesignerAction is also used to add the task items by the adornment service.

Following are different types of glyphs currently used by the designer for different purposes.

TABLE B11

Different Types of Glyphs.
Glyphs and their uses

| | |
|---|---|
| SmartTagGlyph | Used to draw insufficient config. icon on the activity designer in response to validation performed. When user clicks this icon the user actions are displayed in the form of a menu. |
| SelectionGlyph | Base class for displaying the activity designer in selected state. |
| PrimarySelectionGlyph | Shows a activity designer selection state as primary selection state. |
| NonPrimarySelectionGlyph | Shows a activity designer selection state as non primary selection state. |
| ConnectorSelectionGlyph | Base class to draw a connector glyph for selected state. |
| PrimaryConnectorSelectionGlyph | Draws a connector glyph for primary selection state. |
| NonPrimaryConnectorSelectionGlyph | Draws a connector glyph for non primary selection state. |
| BreakPointGlyph | Draws a break point glyph on the activity designer. |

Icons showing connectors that could accept the current dragged objects are drawn through the adornment service. IDesignerService exposes a property "IComponent[ ] DraggedComponents" that allows all activity designers to access dragged object to test them against all current connectors (some designers may allow drop on just a subset of their connectors). When activity is asked for all adornment glyphs through public override DesignerGlyph[ ] Glyphs method it:

checks if the design surface is currently in Drag'n'Drop operation by accessing the DraggedComponents property on IDesignerService
for every connector:

calls CanInsertActivitieso to see if the connector would allow drop operation checks if the designer is not in the read-only site (invoke schedule) by DesignerHelpers.IsContextReadOnly( )

creates an instance of ConnectorDragDropGlyph for that connector

When the cursor with the dragged image hovers over the area in which drop is enabled, the dragged image snaps to the middle of the connector.

OnDragEnter( ) and OnDragOver( ) events get an instance of WorkflowDragEventArgs as the first parameter WorkflowDragEventArgs has a property public Point SnapInPoint{ } that allows designers to indicate that they would like to snap the dragged designer to given point WorkflowView control check if any designer claimed the dragged image and Removes semi-transparent mode for the image Positions the image in the designer-requested location SequentialActivityDesigner overrides both OnDragEnter( ) and OnDragOver( ) events to indicate the middle of the current drop target if it owns it Panning/Zooming Tools The invention includes the following tools: Zoom In/Out (increases/decreases zoom level and centers the view around the point clicked) and Pan (a hand that when clicked "grabs" the design surface and allows to drag it around). Since every tool completely overrides handling of mouse and keyboard events, a Strategy design pattern creates replaceable IDesignerMessageFilter objects that to handle all the events. The interface IDesignerMessageFilter is defined as follows:

```
internal interface IDesignerMessageFilter
{
  Cursor Cursor {get;}
  CommandID Command {get;}
  void OnContextMenu(Point location);
  void OnMouseDown(MouseEventArgs eventArgs);
  void OnMouseMove(MouseEventArgs eventArgs);
  void OnMouseUp(MouseEventArgs eventArgs);
  void OnMouseDoubleClick(MouseEventArgs eventArgs);
  void OnMouseEnter(EventArgs e, Point mousePosition);
  void OnMouseHover(EventArgs e, Point mousePosition);
```

```
        void OnMouseLeave(EventArgs e);
        void OnMouseCaptureChanged(EventArgs e);
        void OnMouseWheel(MouseEventArgs eventArgs, Keys modifierKeys);
        void OnDragEnter(DragEventArgs drgevent);
        void OnDragOver(DragEventArgs drgevent);
        void OnDragLeave(EventArgs e);
        void OnDragDrop(DragEventArgs drgevent);
        void OnGiveFeedback(GiveFeedbackEventArgs gfbevent);
        void OnQueryContinueDrag(QueryContinueDragEventArgs qcdevent);
        void OnKeyDown(KeyEventArgs eventArgs);
        void OnKeyUp(KeyEventArgs eventArgs);
}
```

The functions are split into mouse event handlers, keyboard event handlers, and the UpdateCursor( ) function that changes the WorkflowView cursor shape based on the message filter and it's state.

The workflow view itself implements the default behavior of the designer message filter. Two message filters exist for the zooming functionality (one per Zoom In and Zoom Out, user may switch between In/Out modes by pressing Shift key) and the panning functionality.

XomlDocumentRootView

The control created by XomlWindowPane is XomlDocumentRootView. This control has vertical scroll bar and horizontal scroll bar. Also there are tab buttons on the left side of horizontal scroll bar and on the bottom side of vertical scroll bar. The tab buttons on the horizontal scroll bar is used to display hosting of multiple views. In the first tab it hosts the view returned by surface.GetView( ) which is workflow view and on to the second tab it hosts Microsoft Xml editor. On changing the tabs in horizontal scroll bar it fires appropriate view changed events. It uses IViewCreationService to create views. By hooking up different view creation services, you may add more views. Following is the interface definition of IViewCreationService:

```
public interface IViewCreationService
{
//This property gives the total number of views. Based on the value of this property
//XomlDocumentRootView objects displays tabs in the horiznatal scroll bar.
uint ViewCount { get; }
//This method creates a view based on the index.
IDesignerView CreateView(IRootDesignerView parentView, int index);
// This property is used to provide the image associated with the respective index.
Bitmap GetImage(int index);
//This property provides the text associated with the view on the respective index.
//this text is shown for the tooltip when user hovers over the tabs in the horiziontal scroll bar.
string GetText(int index);
}
```

The implementation of this service does following:

```
public interface IViewCreationService
{
//This property returns only two views. One is the workflow view and the other one is
xoml //view which is text form of xoml file.
uint ViewCount { get; }
//This method gets the workflow view from the DesignSurface for index 0, if there were
//deserialization errors then instead of workflow view it returns
```

```
an error view. For index 1 it returns the Xoml View
IDesignerView CreateView(IRootDesignerView parentView, int index);
// It provides the icons associated with workflow view and Markup view.
Bitmap GetImage(int index);
//This property provides the text associated with the view on the respective index.
//this text is shown for the tooltip when user hovers the mouse over to the tabs in the
horizontal scroll bar.
string GetText(int index);
}
```

Every view created this way must inherit from IDesignerView. The following is an interface definition of IDesignerView:

```
public interface IDesignerView : IServiceProvider
{
//gets or sets the root view object.
IRootDesignerView RootView { get; set; }
//This is called when the user presses the tab, which makes this view to be active.
void    Activate( );
//When user presses the tab and switches over to the other view, then
Deactivate( ) is called
//onto the previous view
void    Deactivate( );
//This is to distinguish between views.
bool    IsDesigner    { get; }
}
```

View Scope
    This is the default view of a scope when added to the designer. Selecting this option takes the developer back to this view.
View Exceptions
    Selecting this option changes the UI in-place to display the exceptions associated with the Scope. This is enabled when Transaction Type is Long Running or None. Stated another way, this menu is not available when Transaction Type is Atomic.
View Events
    Selecting this option changes the UI in-place to display the Event handler associated with the Scope.
View Compensation
    Selecting this option changes the UI in-place to display the Compensation defined with the Scope. This is enabled when the Transaction type property is set to Long Running or Atomic.
Other UI Features
    To make the workflow visually more appealing visual depth may be set which adds shadow to each of the activities displayed in the workflow. Although this adds visual appeal; it slows down the user interaction by a fraction as we have to draw shadows for all the activities in the workflow. The visual depth may be from 0 to 4. Based on this number the shadow depth is decided. When the visual depth is set; every time we draw the workflow, we take its memory snapshot and apply gray scale transformation to the bitmap. This gray scale bitmap is then rendered at the offset specified by the user using visual depth onto the Graphics object. We then make background of the memory snap shot transparent and copy it on top of the gray scale bitmap. Thus giving the workflow a 3D effect.
    Workflow view supports different layouts so that user may be presented with different representations of the workflow. This feature is also used to show the print preview of the workflow. User may edit the workflow, set margins, add header/footers while in print preview mode. This allows user to have a clear idea of how the workflow will be printed. Workflow view hosts multiple layouts through an interface called as IWorkflowLayout. This interface enables the WorkflowView to get information used in drawing different layouts and also enables the layouts to perform specific operations such as coordinate transformations, scaling and drawing.

Following are the properties and methods which are implemented to create a new layout.

TABLE B12

Properties and Methods for Layouts.

| Properties | |
| --- | --- |
| Scaling | Gets the scaling which needs to be done by the layout. Some layouts need ability to apply their own scaling (e.g., PrintPreviewLayout needs ability to scale the workflow fitting in one page to fit in 2 * 2 pages). |
| MaxExtent | Gets maximum extent of the layout. This extent is used by the workflow to set the scroll ranges. |
| WorkflowAlignment | Gets the alignment offset of the workflow. The workflow may be left, centered or right aligned. |
| Methods | |
| PointInLayout | Checks if the coordinate is valid to be in layout. This gives ability to the layouts to decide if a coordinate is valid or invalid. |
| TransformViewPort | Transforms the physical viewport into the logical view port based on the layout by converting the coordinates. |
| ReverseTransformViewPort | Transforms the viewport from logical viewport into physical viewport by doing coordinate conversion. |
| TransformCoOrd | Transforms a coordinate from physical to logical coordinate. |
| ReverseTransformCoOrd | Transforms a coordinate from logical to physical coordinate. |
| Update | Notifies the layout that it needs to be updated. This function is used by the layouts to update the data structures used to render the layout. |
| Draw | Allows the layout to draw itself on the workflow view. |

The designer supports the default layout and the print preview layout. Default layout is simple representation of workflow. In this layout the workflow is centered in the viewport, the layout in no way alters the representation of the workflow which is drawn. The Print preview layout significantly alters the representation of the workflow by drawing the workflow on top of pages. The print preview layout gets the data from print document and page setup data in order to calculate the page size, scaling, and max extent and to render the header/footer. Print preview layout accurately depicts how a workflow will be printed on the printer. In this mode user may set margins, see the way header/footer will be displayed, may scale the workflow and align it as necessary. Print preview layout also enables the user to modify the workflow while previewing it. Print preview layout creates splices the workflow bitmap into multiple pieces so as to render them as different pages.

A drag drop indicator is shown when user starts dragging an object on the WorkflowView. Drag drop indicator visually shows the user which object is currently cached as data object by the drag drop operation. When the workflow view receives the drag enter event it tries to deserialize and cache the dragged components. The view then creates a visual representation of dragged component in the form of memory bitmap by creating a temporary bitmap and drawing the icon and description of the component on it. This memory bitmap is then drawn along with the mouse cursor to indicate which object is being dragged. When the drag operation ends the workflow view destroys the cached bitmaps and components.

The workflow view supports two types of coordinate system. The Client Coordinate system which is calls the physical coordinate system (also used by Winforms control) and the logical coordinate system. In the client coordinate system the top left point of the control is 0,0 and the X and Y coordinates increase vertically and horizontally; this statement is true only when the scrollbar is not present. When the scroll bar is present top left of the Windows control i.e. 0,0 is the scrollbar position. Client coordinate system is also affected by the zoom factor. In the logical coordinate system every object is always mapped 0,0 to m,n and the coordinates are not affected by scroll position or the zoom factor. The coordinates stored by all the activities represented in the workflow are in the form of logical coordinates. This way the activities are not affected by scroll position or zoom factor.

Workflow view has set of following functions which it uses to transform the coordinates between the logical and client coordinates. When a point is converted, the invention takes both the zoom percentage and the scroll position into consideration but when the Size is converted the invention only takes the Zoom percentage into consideration.

Logical to Physical Transformations:
    Point TransformToPhysicalCoOrd(Point point, bool mapToLayout)
    Size TransformToPhysicalSize(Size size)
    Rectangle TransformToPhysicalViewPort(Rectangle logicalViewPort)

Physical to Logical Transformations:
    Point TransformToLogicalCoOrd(Point point, bool mapToLayout)
    Size TransformToLogicalSize(Size size)
    Rectangle TransformToLogicalViewPort(Rectangle physicalViewPort)

Upon creation the workflow view adds a service called IDesignerService to the service container. The activity designers and other hosts query for IDesignerService to communicate with the workflow view and the windows control underneath. Following is the definition of IDesignerService. The properties, methods and events supported by this interface are divided into two main categories UI features which are supported by the design surface i.e. Zoom, VisualDepth, Printing etc and Winforms control features which are exposed in order to render the workflow appropriately.

TABLE B13

Designer Service Properties.

| | |
|---|---|
| Properties | |
| Root | Gets or Sets the Root activity designer on the workflow view. This designer is the root activity which draws the workflow representation. |
| Zoom | Gets or Sets the Zoom percentage. Minimum required Zoom level is 10% and maximum is 400% |
| VisualDepth | Gets or Sets the depth needed to draw the shadows for workflow activities. The visual depth allows the user to give 3D effect to the workflow but it also slows down the drawing. |
| PrintDocument | Gets PrintDocument associated with current workflow. PrintDocument enables the user to print the workflow. |
| PrintPreviewMode | Get or Sets if the workflow view should switch the representation to print preview. In this mode the workflow is divided into pages which will be printed. |
| MaxExtent | Gets the maximum extent of the workflow. |
| Methods | |
| ShowInfoTip | Enables the users to show an informational tool tip on the workflow. |
| EnsureVisible | Scrolls an object represented in the workflow in the visible view. |
| Invalidate | Invalidates area on the design surface for repainting. |
| PerformLayout | Fires layout event which forces all the activity designers in the workflow to update their dimensions. |
| LogicalCoOrdToScreen | Transforms a coordinate from logical coordinate system into physical coordinate system. |
| ScreenCoOrdToLogical | Transforms a coordinate from physical coordinate system into logical coordinate system. |
| Events | |
| DefaultAction | Default action event is fired by the designer when the user double clicks on any part of workflow. |

Workflow view simulates a behavior of virtual windows control for each activity designer in the workflow. This behavior means that even though the activity designers are not actual windows controls, the workflow view forwards the window messages to them in a way exactly identical to the Windows controls. For this in every mouse message the workflow view finds out the designer which is under the mouse cursor using hittesting and buffers it and then forwards enter, hover, move and leave messages appropriately. To maintain the state of which designer is under the mouse cursor and other important mouse information workflow view uses a data structure called MouseEventData. The MouseEventData structure is used to route the messages appropriately to the activity designers.

A DesignerData data structure is used by the workflow view to communicate the information related to the underneath windows control to the activity designer and layout. This information is very important in measuring string sizes and calculating the designer size. A ViewportData data structure is used by the workflow view to communicate the information associated with the viewport to the active layout. This information includes scaling, translation etc. A HittestData data structure is used by the workflow view to get the hittest related information out from the activity designers. The hittest data indicates which part of the activity designer was hit by the mouse. A RenderingHint data structure is used by the designers to render the activity designers. The rendering hint includes color, font, icon and text related drawing information which may be used to draw the activity designers.

Exemplary Algorithms

An exemplary algorithm for drawing includes the following.

```
-Paint Workflow on Memory Device Context by creating a in memory
Bitmap
    -Fill the bitmap background
    -Draw all the designers by calling the draw of root activity designer
        -root activity designer recursively calls the Draw on all designers
within it
        -All designers check if they are in visible region before being drawn
    -Draw the adornments by calling the draw of adornment service
    -Draw the drag rectangle if the user has dragged mouse on the viewport
    -If user has set the visual depth then
        -Draw the bitmap on the original device context at visual depth offset
        -Make the bitmap transparent
        -Draw the bitmap on top without offset
    -Endif
-Call draw on active layout
    -For print preview; draw pages here by splicing the main bitmap
    -For default; directly draw the main bitmap
-If the user is in drag drop mode then
    -Draw the snapshot of the components being dragged
-Endif
-If magnifier is being shown Then
    -Draw the magnifier border
    -Map the magnification region onto the magnified bitmap
    -Draw the magnified bitmap into magnification region
-End if
```

An exemplary algorithm for the layout includes the following.

```
-Call OnLayoutSize on the rootdesigner
    -Rootdesigner and other composite designers call OnLayoutSize on
the child designer
    -Based on the child layout composite designers calculate their size
-Call OnLayoutPosition on the rootdesigner
    -RootDesigner and other composite designers call OnLayoutPosition
on child designers
```

-Designers set the positions based on their parent's position
-Call Update of active layout
   -Layouts update the data structures within them required to render the layout
-Update the rootdesigner location to align the rootdesigner appropriately as requested by layout
-Update the scroll ranges of the scroll bar based on the extent of active layout which uses rootdesigner to calculate the extent An exemplary algorithm for event forwarding includes the following.

-For all mouse events
   -Check the designer on which the event occurred
   -Forward the leave event to the earlier designer using IActivityDesigner interface
   -Forward the enter/hover event to the current designer on which the event occurred using IActivityDesigner interface
   -Buffer the current designer and wait for the next event
-Endfor An exemplary algorithm for deleting includes the following.

-Get the current selected designers by using ISelectionService
-Get all the top level activities associated with the designers. This is because user may do multiple selection and may select parent and child designers and press delete
-For all top level activities
   -Get the parent designer of each top level activity
   -If CanRemoveActivity on the parent designer with child activity returns true
   -Call RemoveActivity on the parent designer with the child activity
   -Endif
-End for
-Get the parent of the last activity removed and select it.

Workflow Designer Keyboard and Command Routing

The designer uses a service IMenuCommandService for commands routing. It is the responsibility of the host to implement this service. The type CommandSet contains a flat list of supported commands (CommandSetItem—derives from System.ComponentModel.Design.MenuCommand). Each command contains a CommandID (comprised of a group ID, and an item ID), a handler for executing the command, and a handler for querying its status (enabled, visible etc'), the commands are injected into the service using IMenuCommandService.AddCommand( ) upon creation. UI cues (keyboard, mouse operation, menu commands) are interpreted to CommandIDs either by the hosting application (VS, Zamm) or in some cases by the workflow view. For example: it is up the host to call the appropriate command when a top menu item is selected. The workflow view, however, handles the mouse operation and keyboard while in focus. In addition, DesignerVerbs, which are special commands associated with individual designers, are declared in the activity designers and automatically collected by the IMenuCommandService.

TABLE B14

CommandSet class

| Member | Use |
| --- | --- |
| CTor | Builds the list of commands, and adds the commands to the IMenuCommandService. |
| OnStatusXXX methods | Evaluates status for the command Each handler is self contained and uses designer services like ISelectionService and IComponentChangeService to perform its task. |
| OnMenuXXX methods | Executes the command. Each handler is self contained and uses designer services like ISelectionService to perform its task. |

TABLE B15

CommandSetItem Class.

| Member | Use |
| --- | --- |
| CTor | Caches a handler for the command Status. Calls the base implementation |
| UpdateStatus( ) | Calls the status handler to evaluate the status of the command. Is called by CommandSet when a selection is changed. |

Command status is evaluated whenever the selection is changed (tracked through ISelectionService). To get current status all the time, use ImmidiateCommandSetItem (derives from CommandSetItem) instead of CommandSetItem.

Printing

The class WorkflowPrintDocument and the public property PrintDocument on the IDesignerService interface supports printing. The WorkflowPrintDocument itself keeps a reference to the WorkflowView it was created by to perform actual drawing. Since the resolution of the printer is different from the screen resolution, before starting actual printing the print document re-layouts the workflow using the printer graphics, prints all the pages and then asks the WorkflowView to perform layout using the screen graphics again.

Activity Designers Interfaces

The IActivityDesigner interface is implemented by all the activity designers which need to participate in the workflow. This is a protocol by which the designers talk with other designers and workflow view. The workflow view looks for the IActivityDesigner interface in order to render, layout or forward events to the designer. Supporting IActivityDesigner interface enables all the designers to act like windows control even though designers are not really derived from windows control. This interface also enables the workflow view and other designer infrastructure like adornment service, menu-command service to exchange information with the designers. The designers derived from IActivityDesigner interface may not have a hierarchy; in order to have a hierarchy the designers need to implement ICompositeActivityDesigner interface. Following is the definition of IActivityDesigner with the details about properties and methods.

TABLE B16

Properties and Methods of IActivity Designer.

Properties

| | |
|---|---|
| Visible | Gets if the designer is currently visible or not. |
| Location | Gets the location of the designer in logical coordinates. |
| Size | Gets the size of the designer in logical coordinates. |
| Bounds | Gets the bounding rectangle of the designer in logical coordinates. |
| ConnectionPoints | Gets the array of points which indicate the locations at which the designer may be connected in the workflow. |
| AssociatedBitmap | Gets the visual bitmap associated with a designer. |
| Glyphs | Gets the glyphs supported by the designer. Ie. Selection, SmartTag etc. |
| DesignerActions | Gets the actions associated with the designer to rectify the configuration. |

Methods

| | |
|---|---|
| Draw | Called by the workflow view in order to draw the designer. The drawing context is passed using the DesignerData structure. |
| HitTest | Called by the workflow view to check if a mouse coordinate was on designer. |
| OnLayoutPosition | Called in response to layout event. This tells the designer to update location property. Composite designers call the layout position on children in response to this function. |
| OnLayoutSize | Called in response to layout event. This tells the designer to update its size. Composite designers call the layout size on children in response to this function. |
| OnMouseDragBegin | Method indicates that a mouse drag started on the designer. Used for rubberbanding and drag drop support. |
| OnMouseDragMove | Method called in response to mouse dragged and moved over the designer. |
| OnMouseDragEnd | Called to notify when the mouse drag is over. |
| OnMouseEnter | Notifies when mouse enter the designer area. |
| OnMouseDown | Notifies if the mouse is clicked on any part of the designer. |
| OnMouseHover | Notifies that the mouse is on the designer and is being hovered. |
| OnMouseUp | Notifies that user released mouse button after clicking it on the designer. |
| OnMouseLeave | Notifies that the mouse has left the designer. |
| OnDragEnter | Indicates to the designer that user is currently in drag drop mode and while dragging has entered the designer. |
| OnDragOver | Indicates that the drag activity is currently taking place over the designer. |
| OnDragLeave | Indicates that while drag drop was in progress the mouse left designer or drag drop activity was terminated. |
| OnDragDrop | Indicates of a successful Drag drop event. |
| OnGiveFeedback | Asks designer to give feedback when drag drop is in progress. |
| OnQueryContinueDrag | Asks if the drag drop event should continue or should be terminated. |
| OnKeyDown | Notifies the selected designer that a key was pressed occurred when the designer was selected. |
| OnKeyUp | Notifies the selected designer that a key was released occurred when the designer was selected. |
| RefreshDesignerActions | Requests the designer to refresh its collection of designer actions. This is also a request to trigger the validation. |
| CanSetParentActivity | Returns if an composite activity may be set as a parent of current activity. |

ICompositeActivityDesigner:

ICompositeActivityDesigner is implemented by the designer which may have hierarchy under them; that is they may have children. The composite designers are responsible to maintain itself and all its children. Using the IComposite-ActivityDesigner interface a composite designer gives away the information about its children, provides functionality to add and remove child designers and enables the keyboard navigation. Following is the definition of ICompositeActivityDesigner with the details about properties and methods.

TABLE B17

Properties and Methods of ICompositeActivityDesigner.

Properties

| | |
|---|---|
| ActivityDesigners | Gets collection of activity designers which make up hierarchy of the CompositeActivityDesigner. |
| CanCollapse | Gets if a activity designer may be collapsed. Expand/Collapse button is shown or hidden in response to this property. |

TABLE B17-continued

Properties and Methods of ICompositeActivityDesigner.

| | |
|---|---|
| Expanded | Get or Sets if the CompositeActivityDesigner is expanded or collapsed. |
| FirstSelectableObject | Gets the first selectable object in the CompositeActivityDesigner hierarchy. |
| LastSelectableObject | Gets the last selectable object in the CompositeActivityDesigner hierarchy. |

Methods

| | |
|---|---|
| IsChildVisible | Return if a child activity contained in the CompositeActivityDesigner hierarchy is visible. |
| EnsureChildIsVisible | Scrolls a child activity in CompositeActivityDesigner hierarchy into visible range. |
| GetNextSelectableObject | Gets next selectable object with the CompositeActivityDesigner hierarchy based on the direction flag passed. |
| CanInsertActivities | Returns if an activity is valid to be inserted into a CompositeActivityDesigner. The context passed to this function identifies where the child activity is being inserted. |
| InsertActivities | Inserts a child activity into CompositeActivityDesigner hierarchy at the specified position passed via context. |
| CanRemoveActivities | Returns if an activity at a specific position indicated using context may be removed from CompositeActivityDesigner hierarchy. |
| RemoveActivities | Removes an activity from a specific position in CompositeActivityDesigner hierarchy. |

Simple Designers

ActivityDesigner class represents the simplest implementation of a designer. All the designers associated with activities in workflow are derived from ActivityDesigner. ActivityDesigner class inherits from IActivityDesigner interface and provides default implementation for the interface. The workflow view talks with the designer using the IActivityDesigner interface. ActivityDesigner class is typically inherited by the designers which need a very lightweight implementation for the drawing of designers. These designers don't have any children or hierarchy. The features offered by the activity designer include basic layouting logic, rendering support (e.g., by drawing icons, description, border, interior and background), rendering the help text, returning default glyphs needed by all the designers, showing context menu through DesignerVerbs, filtering of design time specific properties, default event generation, default hittesting, triggering validation, showing tooltip, and participation in keyboard navigation.

public abstract class ActivityDesigner: ComponentDesigner, IActivityDesigner
System.Object
  System.ComponentModel.Design.ComponentDesigner
    System.Workflow.ComponentModel.Design.ActivityDesigner
      System.Workflow.ComponentModel.Design.CompositeActivityDesigner
      System.Workflow.ComponentModel.Design.CodeDesigner
      System.Workflow.ComponentModel.Design.CompensateDesigner
      System.Workflow.ComponentModel.Design.DelayDesigner
      System.Workflow.ComponentModel.Design.FaultDesigner
      System.Workflow.ComponentModel.Design.CompositeScheduleDesigner
      System.Workflow.ComponentModel.Design.InvokeWebServiceDesigner
      System.Workflow.ComponentModel.Design.BaseReceiveDesigner
      System.Workflow.ComponentModel.Design.BaseSendDesigner
      System.Workflow.ComponentModel.Design.GenericTaskDesigner
      System.Workflow.ComponentModel.Design.STSTaskDesigner Composite Designers CompositeActivityDesigner are the designers which have hierarchy (e.g., they have children underneath). The CompositeActivityDesigner are responsible for managing all the aspects of itself as well as its children. It is also responsible for interacting with its children for forwarding the events. Whenever there is a request to modify the activity designer collection contained by the CompositeActivityDesigner; it is passed a context (ContextBase) which specifies the place from which the activity needs to be removed. ContextBase may be specialized by each CompositeActivityDesigner derived class to specify context specific to them. Example of this is SequentialActivityDesigner which specializes ContextBase by deriving a class called ConnectorContext from it. The CompositeActivityDesigner class derives from the ICompositeActivityDesigner interface and provides default implementation for it. The features provided by the CompositeActivityDesigner include expanding/collapsing of the designers, drag and drop indicators, layouting of self and children, drawing of self and children, hittesting of the children, and inserting removing activities from hierarchy.

public abstract class CompositeActivityDesigner: ActivityDesigner, ICompositeActivityDesigner
System.Object
  System.ComponentModel.Design.ComponentDesigner
    System.Workflow.ComponentModel.Design.ActivityDesigner
      System.Workflow.ComponentModel.Design.CompositeActivityDesigner
        System.Workflow.ComponentModel.Design.SequentialActivityDesigner System.Workflow.ComponentModel.Design.ParallelActivityDesigner
System.Workflow.ComponentModel.Design.ConstrainedActivityDesigner CompositeActivityDesigner is an abstract class and may not be instantiated as it may not exists on its own. Sequential, Parallel and CA designers are all specializations of this class.

SequentialActivityDesigner

SequentialActivityDesigner class represents all the designer which have children underneath and all the children are ordered sequentially. The children are connected by links called connectors which are also used to modify the sequence of children. The SequentialActivityDesigner class is a specialization of CompositeActivityDesigner and provides following set of features: connector start and end bitmap drawing, layouting of all the children sequentially and updating all the connectors linking them, drawing of connectors between the children, highlighting drop areas when drag drop takes place, hittesting the connectors, sequential keyboard navigation using up and down arrows, and returning glyphs for connectors.

internal abstract class SequentialActivityDesigner: CompositeActivityDesigner
System.Object

---

System.ComponentModel.Design.ComponentDesigner
  System.Workflow.ComponentModel.Design.ActivityDesigner
    System.Workflow.ComponentModel.Design.
    CompositeActivityDesigner
      System.Workflow.ComponentModel.Design.
      SequentialActivityDesigner
        System.Workflow.........Design.ActivityPreviewDesigner
        System.Workflow.........Design.
        CompensationHandlerDesigner
        System.Workflow.........Design.ConditionedDesigner
        System.Workflow.........Design.EventHandlerDesigner
      System.Workflow.........Design.ExceptionHandlerDesigner
      System.Workflow.........Design.ScopeDesigner
      System.Workflow.........Design.SequenceDesigner
      System.Workflow.........Design.WhileDesigner

---

All the above designers are specializations of SequentialActivityDesigner; they all mainly differ in drawing. All of these designers have a special way of representing themselves on in the workflow but they all work off a common functionality provided by SequentialActivityDesigner.

ParallelActivityDesigner

ParallelActivityDesigner is another specialization of CompositeActivityDesigner which contains multiple SequentialActivityDesigners. Each of these SequentialActivityDesigners is a branch in parallel designer. The parallel designer offers the following specialized features: layouting of multiple sequential designers, drag and drop indicators for adding additional branches, keyboard navigation for traversing between parallel branches by using left and right arrow keys, and drawing connectors to link the multiple parallel branches.

internal abstract class ParallelActivityDesigner: CompositeActivityDesigner
System.Object

---

System.ComponentModel.Design.ComponentDesigner
  System.Workflow.ComponentModel.Design.ActivityDesigner
    System.Workflow.ComponentModel.Design.
    CompositeActivityDesigner
      System.Workflow.ComponentModel.Design.
      ParallelActivityDesigner -continued System.Workflow.........ConditionalDesigner
        System.Workflow.........ListenDesigner
        System.Workflow.........ParallelDesigner

---

Conditional, Listen and Parallel designers are specialization of ParallelActivityDesigner with additional drawing logic associated with them.

ActivityPreviewDesigner

ActivityPreviewDesigner is sequential designer but has an ability to show collection of multiple designers in the form of collection bag. ActivityPreviewDesigner uses the metaphor of filmstrip to display this collection. When a particular designer is selected it's representation is shown in the preview window which the activity preview designer hosts. The ActivityPreviewDesigner has two modes: edit mode and preview mode. In the preview mode, users cannot modify the designer which is selected. This mode enables the user to see the entire representation of the designer without needing to scroll. Edit mode allows the designer to be modified. Features offered by the ActivityPreviewDesigner include: preview strip to show the collection of activities, preview of the currently selected activity, and ability to edit selected designer.

internal abstract class ActivityPreviewDesigner: SequentialActivityDesigner
System.Object

---

System.ComponentModel.Design.ComponentDesigner
  System.Workflow.ComponentModel.Design.ActivityDesigner
    System.Workflow.ComponentModel.Design.
    CompositeActivityDesigner
      System.Workflow.ComponentModel.Design.
      SequentialActivityDesigner
        System.Workflow.........Design.ActivityPreviewDesigner
          System.Workflow.........Design.GenericCollectionDesigner
          System.Workflow.........Design.CAGDesigner

---

Scope & Service Designer

Scope and Service designers are special designers. Each of these may have exceptions, events and compensation associated with them. Scope and Schedule also have a class associated with them in the user code file and user has ability to scope variables in these classes. Scope and Service designers are illustrated differently than other designers and show a watermark and highlight them by drawing a drop shadow.

Scope and Service designers have ability of changing the views so that a user may flip the views to reveal exception, events and compensation associated with them. When the user hovers on the Service or Scope icon a drop down palette appears which allows the user to pick one of the exception, event or compensation views. The designer view is then flipped and the activities contained in the selected view are shown. User may only view activities belonging to any one of the view at any point of time. The flipping of views is achieved by filtering the child activities contained in the Scope or Schedule. Scope and Schedule may have at most one of ExceptionHandlers, EventHandlers and Compensation as its children. Based on the view which user is looking at; the designer filters out these children to only show the child activities which may appear in the chosen view; thus achieving effect of supporting multiple views. Schedule designer is usually set as the root designer in the workflow view.

internal class ScopeDesigner: SequentialActivityDesigner
    internal class ServiceDesigner: ScopeDesigner System.Object

---

System.ComponentModel.Design.ComponentDesigner
   System.Workflow.ComponentModel.Design.ActivityDesigner
      System.Workflow.ComponentModel.Design.
      CompositeActivityDesigner
         System.Workflow.ComponentModel.Design.
         SequentialActivityDesigner
            System.Workflow.........Design.ScopeDesigner
               System.Workflow.........Design.ServiceDesigner

---

ServiceRootDesigner

ServiceRootDesigner is associated with the Root component contained by Designer Host. It is responsible for creating the workflow view which is then hosted in designer window pane. ServiceRootDesigner also supports IToolBoxUser interface which gives the ability to add toolbox items in the workflow by double clicking on the toolbox items.

Design-Time Descriptors

Each activity in the authoring object model has meta-data that describes its behavior during design-time. This includes associating the activties (designers) as well as property grid behavior (naming, description, filtering, property editors, etc.). Type\Property\Event design time behavior is described using a zero or more of the following attributes:

SRCategoryAttribute—orchestration engine attribute. Provides localized category name.

SRDescriptionAttribute—orchestration engine attribute. Provides localized description.

EditorAttribute—provides a UITypeEditor.

TypeConverter—provides filtering, value list, and conversion between types.

BrowsableAtrribute—show\hides members during design time.

SRCategory and SRDescription are merely mapping between a resource name and a string. Most editors (UIType-Editor) are managers for handling dialogs (like the CorrelationSetsDialog) or dropdown lists. The PropertyDescriptor handles the property in design time and is handed the property either by a default TypeConverter, a custom TypeConverter (that is declared as attribute as above) or a TypeDescriptor.

UI Type Editors Provide editors to various properties in the orchestration engine Component model. The Property browser use them to display ellipsis or drop down and to launch the editors.

Type Converters

The type converter provides methods to convert the object to/from other types, provides a PropertyDescriptor list that represents the object properties in design time and might provide values to be used in a propertygrid's property's dropdown.

Followed are some of the TypeConverters implemented in the orchestration engine Component model:

DeclTypeConverter
Base class to all activity's Type converters. implements CanConvertFrom( ), CanConvertTo( ), Convert From( ), ConvertTo( ) that convert activity objects to/from strings (To display the name of the activity in the property grid, and allow name editing to create the activity). Also, GetSite ( ) provides access to the services.

HandlerDeclTypeConverter
Type converter for events. Derives from DeclTypeConverter. Implements GetStandardValues( ) that uses IEventBindingService to display compatible handlers.

VariableDeclTypeConverter
Type converter for variables (messages, channel, correlations etc').Derives from DeclTypeConverter. Implements GetStandardValues( ) that uses IFieldBindingService to display compatible variable fields. In addition, the Type converter filters out the "Name" property and set a special propertyDescriptor for the type property that manifest as generic type.

Property Descriptors

Property descriptor provides design time services to activity objects. It provides name, description, category, type converter information as well as additional functionality when gettingsetting the property value. By default, the TypeConverter will provide the PropertyDescriptors to all properties. The TypeConverter, however, may remove, add, or wrap them to provide a different design-time behavior of the type.

Followed are some of the PropertyDescriptors implemented in the authoring object model:

DynamicPropertyDescriptor
Base class to all property descriptors in the authoring object model. Implements a wrapper around the default property descriptor and delegates all the methods to it. In addition, provides access to the object site, either directly from the object (if it is component) or via the IReferenceService.

VariableDeclPropertyDescriptor
Property descriptor for all variables (message, channel, correlation etc'). Overloads SetValue( ) to provide code beside field as follows:
Get the variable to set and its site.
Get the site of the containing scope.
Get the IFieldBindingService of the containing scope. Note that each scope has its own IFieldBindingService with its own set of fields.
Validate the field name with the service.
Open a designer transaction.
Save the value
Call IFieldBindingService.CreateField( ) to add the field to the code beside file.
Commit the transaction HandlerDeclPropertyDescriptor
Property descriptor for all Handlers. Overloads SetValue( ) to provide code beside field as follows:
Get the HandlerDeclaration object to set and its site.
Get the IEventBindingService.
Open a designer transaction.
Create a LocalEventDescriptor.
Get the PropertyDescriptor for the event (using eventBindingService.GetEventProperty( )) and set the HandlerDeclaration on it.
Set the "Name" property of the HandlerDeclaration object
Commit the transaction.

ArrayElementPropertyDescriptor
Property descriptor that represents an item in a collection. Since collection items—for example, Correlation Sets—do not have property descriptor (they are not properties) the ArrayElementPropertyDescriptor fakes a descriptor as if they were properties, thus allows to display them inside a property browser. This property descriptor was designed to be wrapped by any of the property descriptors described above.

LocalEventDescriptor
EventDescriptor for represent Handler Declarations. Handlers in the authoring object model are not real events, but properties, so we introduce our own EventDescriptors for the IEventBindingService to be used.

Using ICustomTypeDescriptor

ICustomTypeDescriptor is an alternate way for setting descriptors for a component. The component itself implements the interface and provides the descriptors, as type converter, defaults, etc. GenericActivity, InvokeWebServiceActivity and InvokeSchedule implement this interface.

Using IExtenderProvider

This is yet another technique for introducing design time properties to a component. The extension class RulePropertyProviderExtender provides rule properties to the ServiceDesigner. Properties are added by decorating the extender class via ProvidePropertyAttribute, implementing getter and setter for the attribute, and adding the extender class to a IExtenderProviderService class (in our case, implemented by RulePropertyProviderExtender) that is accessible through the site of the component (Schedule.Site)

Extensibility Support

The System.Workflow.ComponentModel.Design namespace provides various reusable classes for user to use in creating their own activity designers and plugging them into the orchestration engine designer. Following is the list of classes which user may use.

ActivityDesigner: ActivityDesigner gives the user ability to add simple activities which do not have hierarchy of other activities under it. The user needs to inherit from this designer and may customize the bitmap, description and drawing.

SequentialActivityDesigner: SequentialActivityDesigner allows the user to write a designer which may contain multiple activities in it. All of these activities are arranged sequentially and are linked using connector lines. User may derive from this class and provide custom coloring, description, icon etc.

ParallelActivityDesigner: ParallelActivityDesigner enables user to write activity designer which may have multiple composite activities in it, arranged in parallel fashion. This class also enables the user to customize description, icon, colors, etc. This class is extensible thru inheritance.

OrchestrationEngineToolboxItem: OrchestrationEngineToolboxItem allows the user to create a custom toolbox item. This class gives user an ability to control serialization. The class provides hooks using which the user may popup custom UI when an activity is added in the designer. The user may reuse this class through inheritance. The user needs to provide the toolbox item by using the ToolBoxItem attribute.

TypeBrowserEditor: The TypeBrowserEditor allows the user to browse the types available in the designer. This class is used by associating it with a property which is of type System.Type. The user uses UITypeEditor attribute to associate this class with a property.

TypeConverter classes: the orchestration engine component model provides various type converters which allow the user to define their own type converters. All the type converters may be used by extending them through inheritance.

DesignerGlyph: Designer Glyph class may be used by the user to draw custom glyphs on top of the designers. The may want to display certain visual glyphs which need drawing at the top most Z order. The DesignerGlyph class may be used to draw such glyphs. This class may be used by extending it through inheritance.

DesignerAction: User may associate DesignerActions with DesignerGlyphs. The actions are shown when the user clicks on the DesignerGlyphs. Custom designer actions may be created by inheriting from DesignerAction class.

What is claimed is:

1. A method for modeling a workflow, said workflow including activities, said workflow modeling a business process, said method comprising:

displaying a plurality of activities on a display of a computer system, said plurality of activities being stored in a memory of the computer system;

receiving a selection of the activities from a user via a user interface selection device of the computer system, said received selection of the activities to be included in the workflow;

displaying the received selection of activities on the display;

receiving from the user via the user interface selection device structure information for the selection of activities, said received structure information to be used to form the workflow;

receiving a user-defined activity from the user via the user interface selection device, said user-defined activity having one or more semantics associated therewith;

evaluating the semantics for conformance to a predefined interface requirement;

displaying the received user-defined activity on the display as one of the plurality of activities as a function of said evaluating;

receiving business logic from the user via the user interface selection device for association with one or more activities in the selection of activities;

arranging the displayed selection of activities on the display in accordance with the received structure information and the business logic associated with the activities in the selection of activities to create the workflow for execution by the computer system;

translating the created workflow into a user-designated language by the computer system in response to receiving a command from the user via the user interface selection device; and executing the user-designed language of the translated workflow by the computer system.

2. The method of claim 1, wherein displaying the plurality of activities comprises displaying the plurality of activities in one or more of the following in the display: a palette display area and a workspace display area.

3. The method of claim 1, further comprising:
receiving customization information from the user via the user interface selection device; and
adjusting the displayed plurality of activities as a function of the received customization information.

4. The method of claim 1, further comprising:
receiving a user-defined theme from the user via the user interface selection device, said user-defined theme defining one or more visual aspects of the display; and
applying the received user-defined theme to the selection of activities arranged on the display.

5. In a computer system having a display and a user interface selection device, one or more computer-readable storage media having computer-executable components for modeling a workflow, said workflow including activities, said workflow modeling a business process, said components comprising:

a rendering component for displaying a plurality of activities on the display;

an interface component for receiving a selection of the activities displayed by the rendering component from a user via the user interface selection device and receiving business logic representing software code from the user via the user interface selection device for association with one or more activities in the selection of activities, said received selection of the activities being included in the workflow, said rendering component further displaying on the display the selection of activities received by the interface component, said interface component further receiving structure information of the plurality of activities to form the workflow from the user via the user interface selection device, wherein the interface component further receives a user-defined activity from the user via the user interface selection device, said user-defined activity having one or more user-defined semantics associated therewith; and a designer component for arranging the selection of activities on the display in accordance with the received structure information and the business logic associated with the activities in the selection of activities to create the workflow, said designer component translating the created workflow into a user-designated language by the computer system in response to the received user-defined activity.

6. The computer-readable storage media of claim 5, further comprising a validation component for evaluating the semantics for conformance to a predefined interface requirement.

7. The computer-readable storage media of claim 6, wherein the rendering component further displays the received user-defined activity on the display as one of the plurality of activities as a function of the validation component.

8. The computer-readable storage media of claim 5, wherein the rendering component, interface component, and designer component execute within an execution environment of an application program.

9. The computer-readable storage media of claim 5, wherein the interface component comprises one or more of the following: a graphical user interface and an application programming interface.

10. A system for modeling a workflow, said workflow including activities, said workflow modeling a business process, said system comprising:

a memory area for storing a plurality of activities;
a display area for displaying the plurality of activities stored in the memory area;
a processor configured to execute computer-executable instructions for:
 receiving a selection of the activities via the display area from a user;
 displaying the received selection of activities in the display area;
 receiving from the user via the display area structure information for the selection of activities, said received structure information to be used to form the workflow;
 receiving from the user via the display area business logic representing software code for association with one or more activities in the selection of activities;
 arranging the displayed selection of activities in the display area in accordance with the received structure information and the business logic associated with the activities in the selection of activities to create the workflow;
 translating the created workflow into a user-designated language by the processor in response to receiving a command from the user via the display area; and
 executing the user-designated language of the translated workflow.

11. The system of claim 10, further comprising a display device containing the display area.

12. The system of claim 10, further comprising a user interface selection device operable with the processor.

13. The system of claim 10, wherein the display area comprises a user interface.

14. The system of claim 10, wherein the display area is adapted for display within an execution environment of an application program.

15. The system of claim 10, further comprising means for one or more of the following: displaying the plurality of activities, receiving the selection of the activities, receiving the structure information from the user, and arranging the displayed selection of activities in accordance with the received structure information to create a workflow.

* * * * *